(12) United States Patent
Fisk

(10) Patent No.: US 10,969,100 B2
(45) Date of Patent: Apr. 6, 2021

(54) METHOD AND APPARATUS FOR THERMAL PROCESSING

(71) Applicant: Brian Fisk, Portland, OR (US)

(72) Inventor: Brian Fisk, Portland, OR (US)

(*) Notice: Subject to any disclaimer, the term of this patent is extended or adjusted under 35 U.S.C. 154(b) by 0 days.

(21) Appl. No.: 16/354,133

(22) Filed: Mar. 14, 2019

(65) Prior Publication Data
US 2020/0049347 A1    Feb. 13, 2020

Related U.S. Application Data

(62) Division of application No. 15/212,134, filed on Jul. 15, 2016, now Pat. No. 10,240,783.
(Continued)

(51) Int. Cl.
*C10L 1/12* (2006.01)
*F23G 7/00* (2006.01)
(Continued)

(52) U.S. Cl.
CPC .............. *F23G 7/008* (2013.01); *B01D 1/14* (2013.01); *F23G 5/04* (2013.01); *F23G 5/12* (2013.01); *F23G 5/38* (2013.01); *F23G 5/46* (2013.01)

(58) Field of Classification Search
CPC . F23G 7/008; F23G 5/12; F23G 5/033; F23G 5/0276; F23G 5/04; F23G 5/08; F23G 7/10; F23G 2201/40; F23G 2201/702; F23G 2204/203; F23G 2205/121; F23G 2900/7005; F23G 2900/7008; F23G 5/0273; F23G 5/14; F23G 5/30; F23G 5/40; F23G 7/003; F23G 7/065; B01D 5/006; B01D 3/007; B01D 29/01; B01D 29/52; B01D 29/66; B01D 29/96; B01D 1/0058; B01D 1/02887; B01D 3/42; B01D 1/28; B01D 3/06; B01D 3/00; B01D 1/2893; B01D 1/0047; B01D 1/0082; B01D 1/16; B01D 1/305; B01D 1/02; B01D 1/065; B01D 1/221; B01D 1/289; B01D 35/12; B01D 45/08; B01D 5/0015; B01D 5/009; B01D 1/22; B01D 1/26; B01D 1/2818;
(Continued)

(56) References Cited

U.S. PATENT DOCUMENTS 3,252,435 A    5/1966   Bogot et al.
3,503,383 A    3/1970   Meyer
(Continued)

*Primary Examiner* — Jason Lau
(74) *Attorney, Agent, or Firm* — Scheinberg & Associates, PC; Michael O. Scheinberg

(57) ABSTRACT

A method and apparatus for thermal processing of contaminated liquids is disclosed. The system employs an efficient and robust pulse jet burner as its basic energy source. This energy is then used to generate steam which may subsequently be used for a variety of processing and purification steps. A multiple-chamber approach is used: a burner chamber contains the pulse jet burner, a neighboring heat exchanger chamber uses this heat energy to initiate the purification process which started in a third neighboring coagulator chamber into which the contaminated fluids are initially introduced to the system. Combustible liquids which are separated from the contaminated fluids may be used to power the pulse jet for self-contained operation. High temperature flue gases from the pulse jet pass through a supercharger box and then into a vortex dryer which may have a secondary vortex dryer for initial drying of wet solid fuels.

6 Claims, 23 Drawing Sheets

Related U.S. Application Data

(60) Provisional application No. 62/193,577, filed on Jul. 16, 2015.

(51) Int. Cl.
  *B01D 1/14* (2006.01)
  *F23G 5/04* (2006.01)
  *F23G 5/12* (2006.01)
  *F23G 5/38* (2006.01)
  *F23G 5/46* (2006.01)

(58) Field of Classification Search
  CPC ............ B01D 1/2896; B01D 2257/504; B01D 3/065; B01D 3/10; B01D 3/146; B01D 3/34; B01D 53/62; B01D 5/0003; B01D 5/0012; B01D 5/0039; B01D 1/0039; B01D 1/0035; B01D 1/04; B01D 1/06; B01D 1/14; B01D 1/225; B01D 1/226; B01D 2251/2067; B01D 2251/402; B01D 2251/404; B01D 2251/602; B01D 2252/1035; B01D 2253/1124; B01D 2256/16; B01D 2257/302; B01D 2257/404; B01D 2257/502; B01D 2257/602; B01D 2257/80; B01D 2313/02; B01D 2313/04; B01D 2313/10; B01D 2319/06; B01D 3/02; B01D 53/047; B01D 53/1418; B01D 53/1475; B01D 53/18; B01D 53/265; B01D 53/48; B01D 53/505; B01D 53/52; B01D 53/565; B01D 53/60; B01D 53/64; B01D 53/83; B01D 53/8631; B01D 53/90; B01D 5/0006; B01D 5/0009; B01D 5/0036; B01D 5/0072; B01D 5/0081; B01D 61/002; B01D 61/364; B01D 3/08; B01D 63/082; B01D 63/10; B01D 65/003; C02F 1/16; C02F 1/048; C02F 1/041; C02F 2303/10; C02F 1/008; C02F 1/12; C02F 9/00; C02F 1/04; C02F 1/042; C02F 1/14; C02F 1/18; C02F 1/001; C02F 1/004; C02F 1/08; C02F 1/283; C02F 1/325; C02F 2103/06; C02F 2103/08; C02F 2209/05; C02F 11/06; C02F 11/12; C02F 1/00; C02F 1/06; C02F 1/10; C02F 1/20; C02F 1/281; C02F 1/286; C02F 1/441; C02F 1/444; C02F 2001/425; C02F 2101/10; C02F 2101/20; C02F 2103/10; C02F 2103/18; C02F 2103/20; C02F 2201/009; C02F 2201/322; C02F 2209/005; C02F 2209/006; C02F 2209/008; C02F 2209/40; C02F 2301/063; C02F 2301/08; C02F 2303/04; C02F 2303/06; C02F 2303/26; C02F 2307/10; C02F 5/025; C02F 5/06
  See application file for complete search history.

(56) References Cited

U.S. PATENT DOCUMENTS

| | | |
|---|---|---|
| 5,381,742 A | 1/1995 | Linton et al. |
| 6,200,428 B1 | 3/2001 | Vankouwenberg |
| 2008/0112861 A1 | 5/2008 | Fisk et al. |
| 2009/0277770 A1 | 11/2009 | Malatesta |

END VIEW OF CHAMBER #3

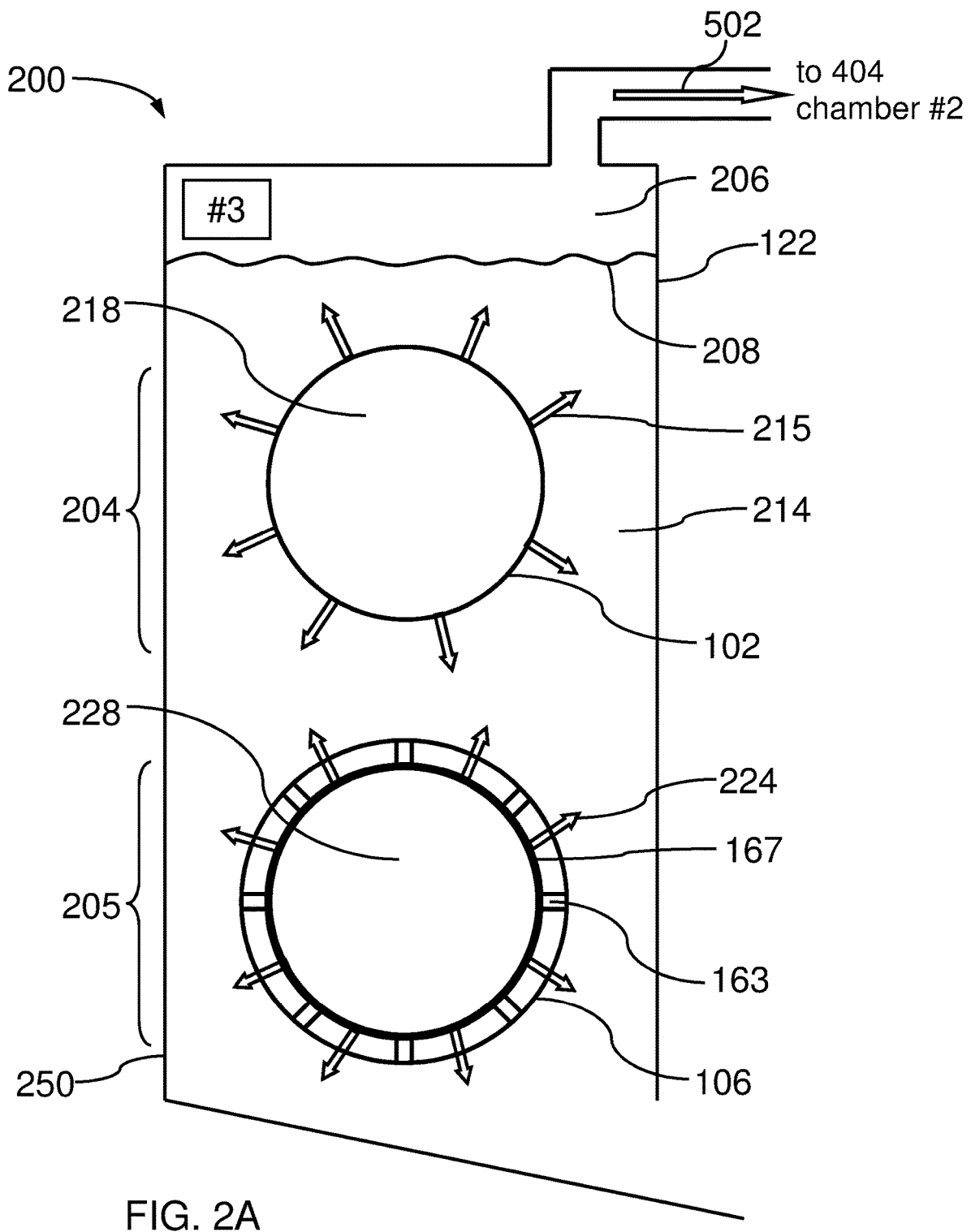
FIG. 2A     SECTION A-A

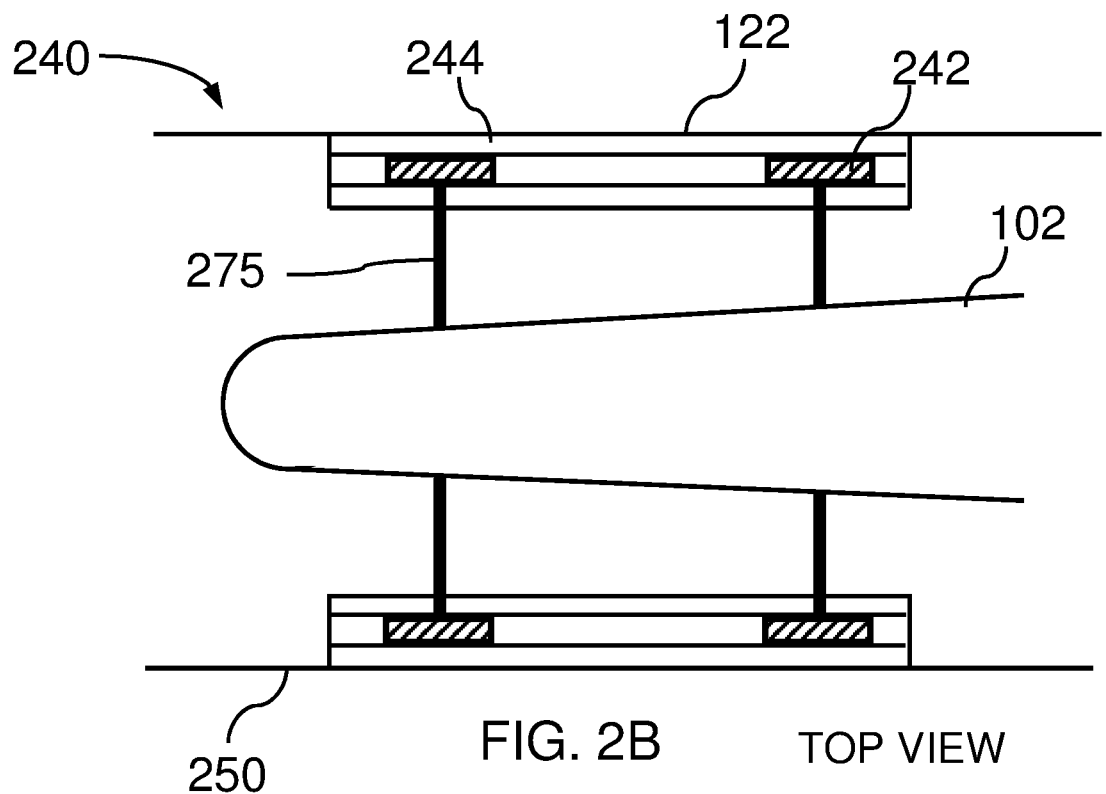
FIG. 2B  TOP VIEW
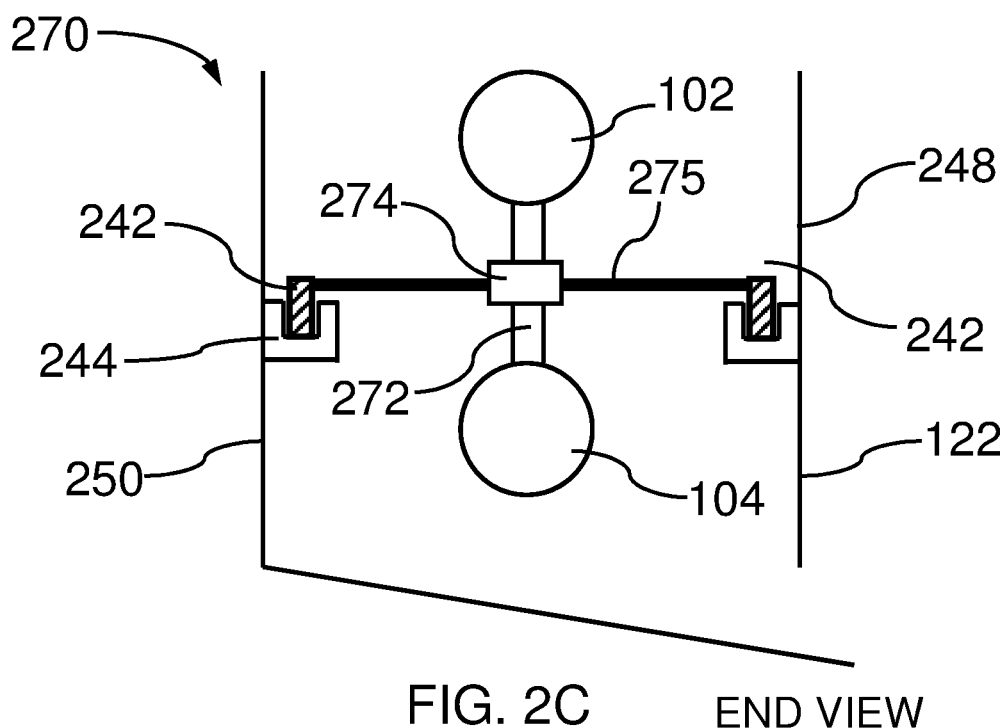
FIG. 2C  END VIEW

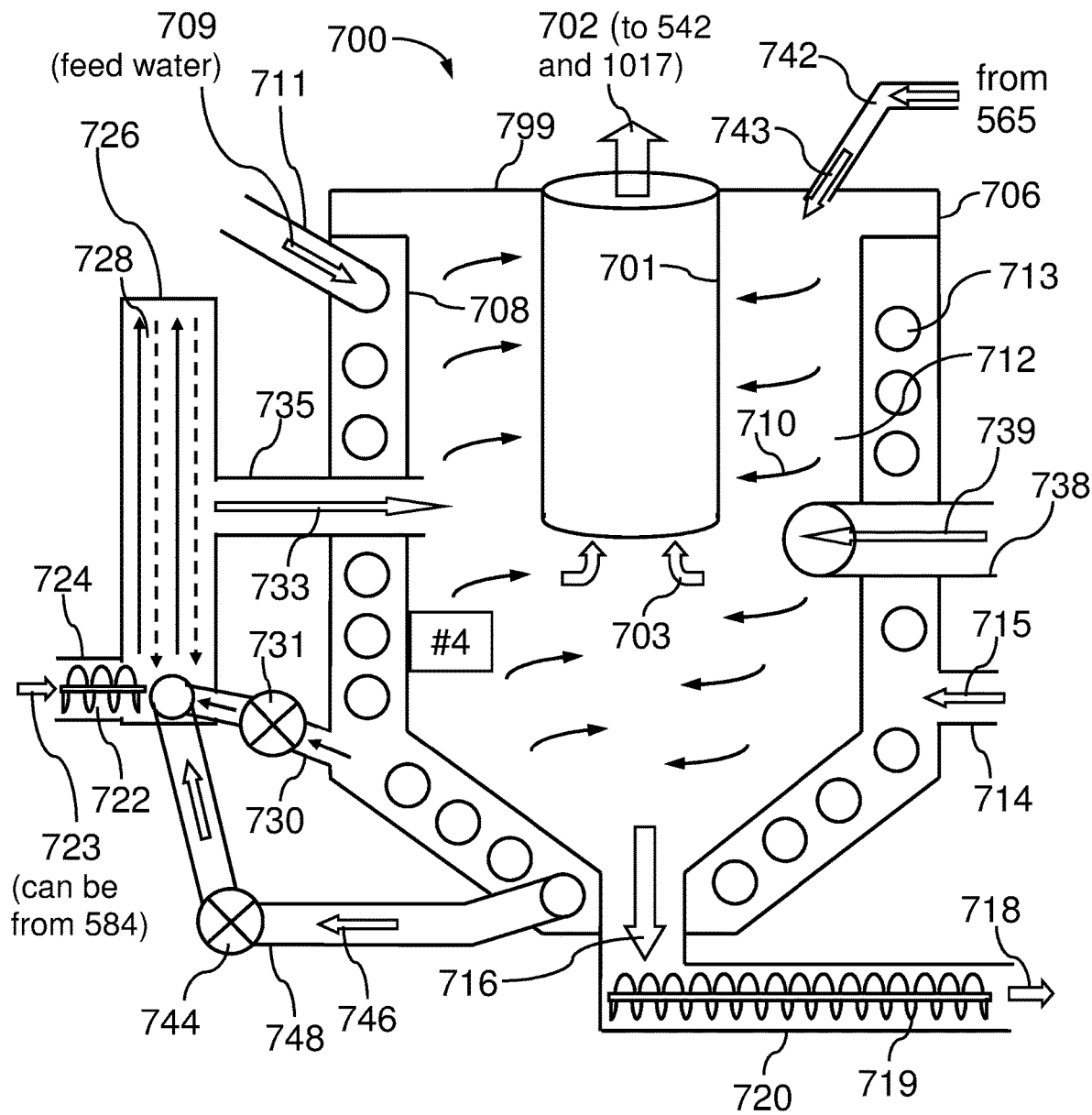
SIDE VIEW     FIG. 7A

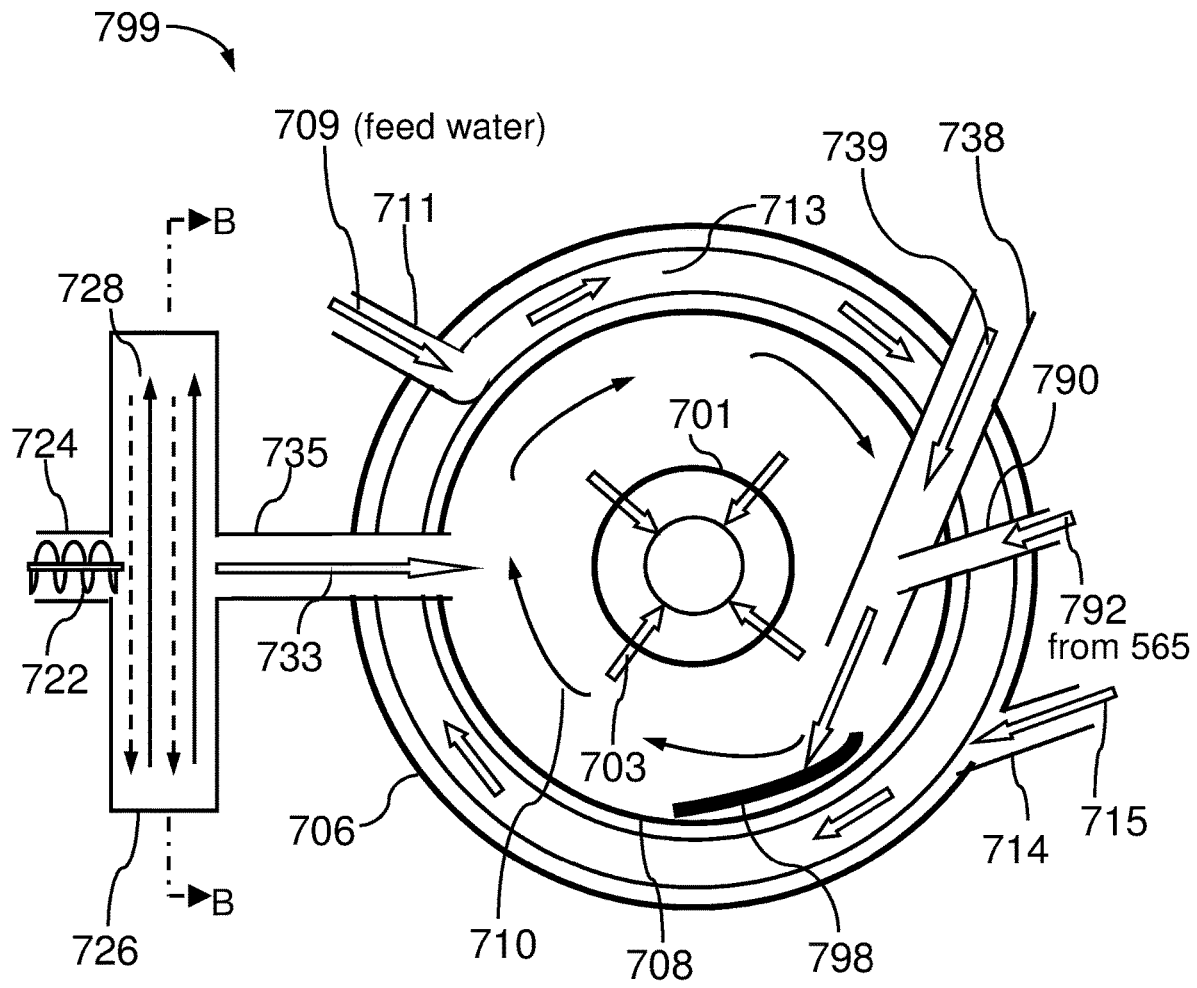
TOP VIEW     FIG. 7B

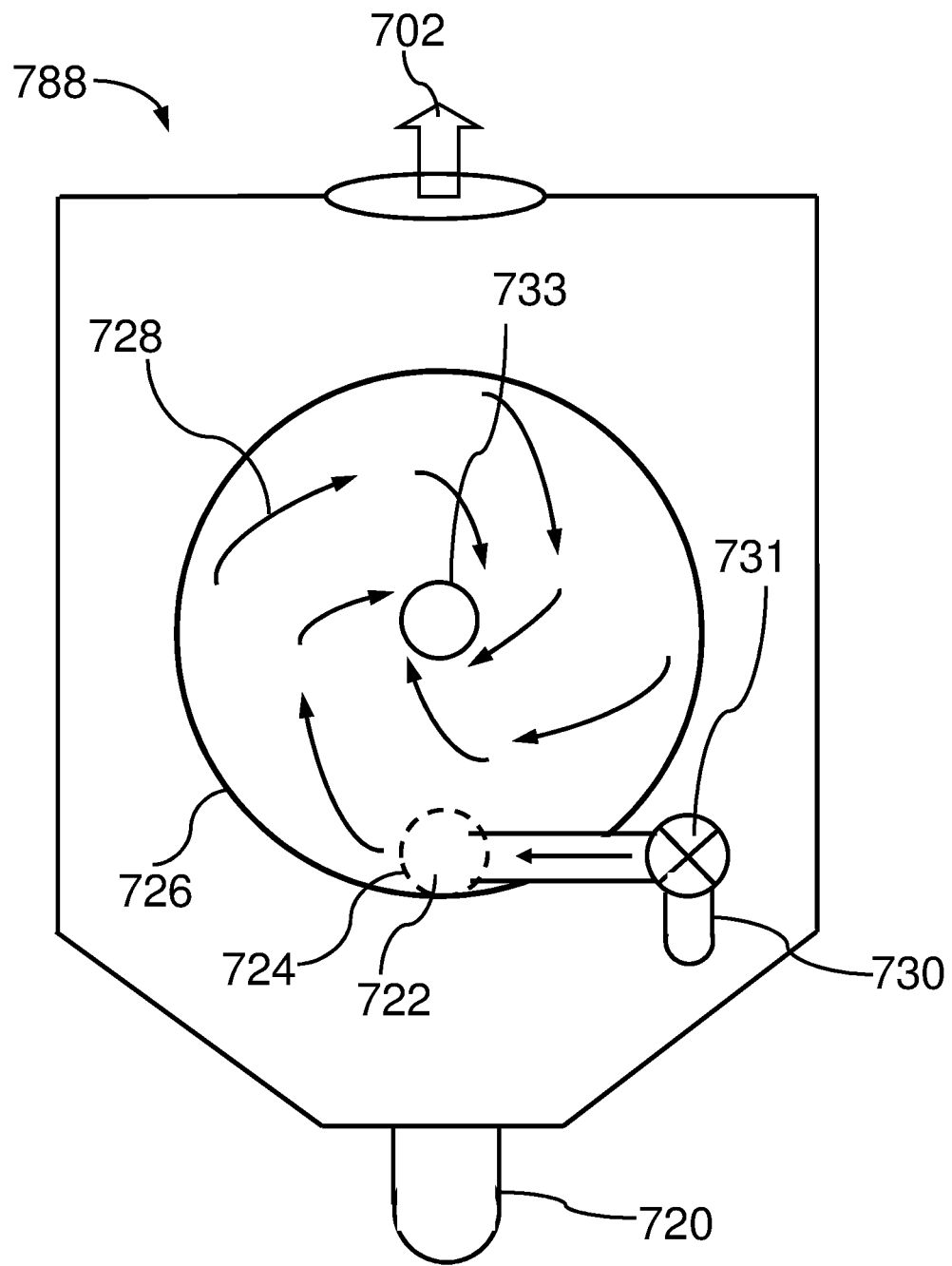
FIG. 7C   SECTION B-B

METHOD AND APPARATUS FOR THERMAL PROCESSING

This application is a divisional of U.S. application Ser. No. 15/212,134, filed Jul. 15, 2016, which claims priority from U.S. Prov. Pat. App. 62/193,577, filed Jul. 16, 2015, which are hereby incorporated by reference.

BACKGROUND OF THE INVENTION

Technology based on thermal processing today has advanced well beyond the campfire. Earlier technologies for the processing of waste liquids have been distillation, reverse osmosis, micro filtration, chemical filtration, electro-coagulation, etc. These processes work to varying degrees—some better than others. Still difficult to process are combinations of chemicals, minerals, bacteria, and heavy metals including both organic and inorganic compounds—these combinations do not allow just a single process to purify and restore the water back to a usable commodity. Modern industry requires a modern solution. Most membrane processors and clarifying processes have major quantities of polluted materials that are now a concentrated and a larger liability after processing. Many processes treat the suspended solid but not the dissolved solids. Membranes are easily destroyed by volatile organic compounds. In other words, today's effluents demand a solution that is efficient, safe, and viable to effectively deal with the complex problems created by industry today.

What the problem requires is an enhanced structure and method for reacting the targeted condition and creating a series of separations and thermal reconstructions of the targeted effluent that in turn create a series of products from the effluents and the residual waste.

Thermal processors utilize heat for executing a desired chemical or physical change to a substance or to things. A furnace is a type of thermal processor that produces heat, such as by combustion of a fuel or by application of electrical energy, for application to a thing, a space, or a substance. Other types of thermal processors receive heat energy from an external source and condition, augment, and/or direct the heat in a desired manner.

A well-known example of a thermal processor is a residential furnace that produces hot air or hot water for heating buildings. Another type of thermal processor applies heat for melting or shaping a material such as a metal for a desired purpose. Yet another type of thermal processor is used for heat-treating objects or materials (e.g., metals, glasses, and ceramics) for annealing purposes or to change a physical characteristic of the objects or materials. Yet another type of thermal processor is used for incinerating or otherwise converting waste material in a manner that reduces the volume of the waste, converts the waste to a less noxious and/or more useful material, and/or forms from the waste a more easily handled material.

Another type of conventional thermal processor is generally termed an "evaporator," which receives a target material (which can be a solid or liquid) and applies heat to the target material for converting at least a portion of the target material into a gas or vapor that can be used for another purpose or safely disposed. Evaporators have many uses, including separating a liquid from solids or from other substances present in the liquid, separating one type of liquid from a mixture containing at least one other type of liquid, or separating a liquid from a gas. For example, an evaporator used for separating a liquid from suspended solids in the liquid typically includes a heat source that heats the mixture to a temperature allowing separation of the liquid (e.g., by forming a vapor from the liquid and condensing the vapor) from the solids.

A substantial operational challenge associated with many conventional evaporators is dealing with the sludges and other substantially solid materials (usually waste materials) left behind from the evaporation. For example, a key problem with sludges and cakes is their tendency to accumulate in locations (such as on heated surfaces) in a manner that substantially reduces the efficiency or efficacy of the evaporator.

Hence, an evaporator or other thermal processor that could be placed at a well site and used for reclaiming well by-products in an efficient manner for useful purposes would be advantageous.

Further, with respect to oil wells and other extraction sites of fossil fuels (including coal deposits), many of these sites contain substantial amounts of gaseous methane and other low-molecular-weight hydrocarbons as byproducts of extraction of the target material from the sites. The sites are usually poorly equipped to recover these gaseous byproducts, which almost always require treatment to make the byproducts commercially usable. Since the gaseous byproducts are usually combustible, if not recovered they are simply flared off or otherwise discharged into the atmosphere without any effort being made to recover useful energy from them. Hence, for these and other situations, there is a need for thermal processing apparatus that would allow for recovery and conversion of these gases and other reactive gases into a source of heat for on-site processing.

SUMMARY OF THE INVENTION

An object of the invention is to provide structures and methods that lend themselves to effectively and efficiently processing the majority of industrial waste water conditions.

A thermal processing apparatus for processing both contaminated liquids and solid wastes, comprises a first chamber comprises a water-filled burner chamber, comprising:
- a pulse jet burner, fully immersed in the water and having an inlet and an outlet; and
- a steam outlet; and
- an air-filled supercharger box configured to provide air to the inlet and outlet of the pulse jet burner;
- a second chamber, comprising an array of heat exchanger tubes having a steam inlet and a steam outlet, wherein the steam inlet is configured to receive steam from the steam outlet of the first chamber; and
- a third chamber, comprising an array of coagulator tubes or plates having a steam inlet and a steam outlet, wherein the steam inlet is configured to receive steam from the steam outlet of the heat exchanger tubes.

BRIEF DESCRIPTION OF THE DRAWINGS

For a more thorough understanding of the present invention, and advantages thereof, reference is now made to the following descriptions taken in conjunction with the accompanying drawings, in which:

FIG. 2A illustrates schematically section A-A of the burner chamber in FIG. 1A.

FIG. 2B illustrates schematically a top view of the sliding support structure for the pulse jet in the burner chamber.

FIG. 2C is a schematic end view of the sliding support structure for the pulse jet in the burner chamber.

FIG. 7A is a side cross-sectional schematic view of the dry solids processing chamber #4.

FIG. 7B is a top cross-sectional schematic view of the dry solids processing chamber #4.

FIG. 7C shows section B-B of the dry solids processing chamber #4.

DETAILED DESCRIPTION

Figure 1A:
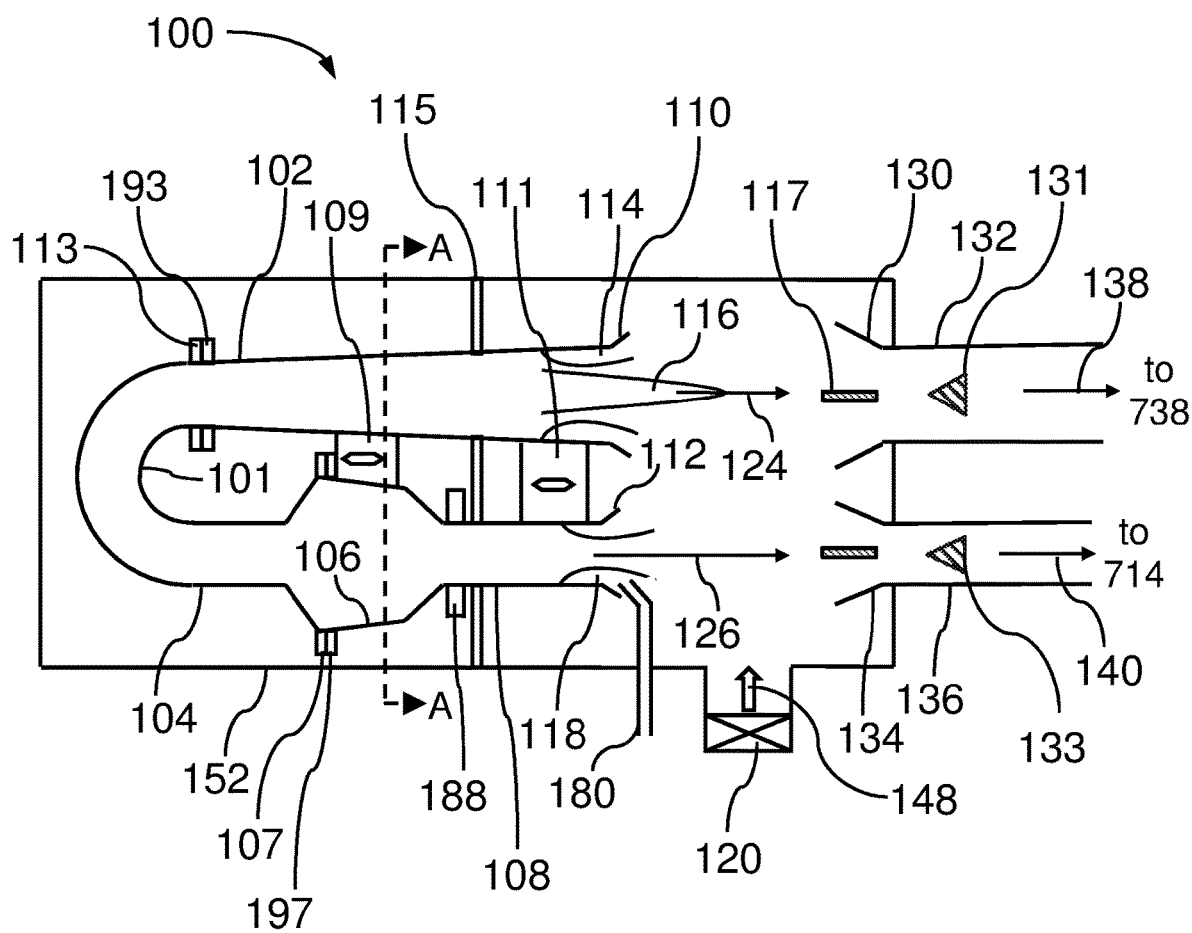
FIG. 1A is a schematic cross-sectional view of the burner chamber.

The subject apparatus and methods are described in the context of representative embodiments that are not intended to be limiting in any way.

In the following description, certain terms may be used such as "up", "down", "upper", "lower", "horizontal", "vertical", "left", "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Embodiments of the invention can eliminate the need for injection wells and storage of contaminated materials, enabling responsible and technically affordable solutions. This will free future generations from the burden of a damaged and polluted environment. The correction and rehabilitation of the environment can be accomplished with these new environmentally friendly processes.

Embodiments of the invention provide a high pressure burner for use in submerged combustion thermal processor for processing oil production waters.

Embodiments of the invention can provide an energy source compatible with the thermal recovery of waste processing gases for processing production and fracking water into a pure distillate for enhanced oil recovery (EOR). In some embodiments, prior art thermal processes are modified with a unique twist that accommodates remedies these processes' shortcomings. These shortcomings directly enhance production and become assets in the thermal processor of the present invention.

A thermal processor developed by the inventor in the early 1990's demonstrated the ability to process many fluids with various contaminants and emulsions that were costly to crack and offered thermal recovery of value to add to this unique distillation process. Oil fields that had low grade gases which were being flared off could easily handle this processing needed to increase viability and provide gases for EOR. The problems of shallow recovery wells and deeper wells can be accommodated by the availability of byproducts of this enhanced distillation. Pressures and simplified injection are products of this method of recovery.

In some embodiments, the process begins with a dynamic compressor-less ("valveless pulse jet") burner. The burner uses a shock wave to act as a valve (instead of an actual valve) to draw gases into the combustion chamber. The inlet can have a valve or a specially-shaped orifice that accommodates the shock wave, creating an interruption of flow into the burner chamber. The pulse created by this wave creates a suction as the gases from combustion move through the burner. The shock wave also stops incoming gas or fluid by means of the dynamic increase in energy as the shock wave expands. The combustion chamber depends on the motion of the gas moving through the tube with a lower pressure at one end to create the flow of gases during the expansion of the shock wave. This use of gases eliminates the need for a compressor to add air or create flow at the same time providing enough air to maintain a proper stoichiometric fuel-air ratio.

The normal shortcomings of this type of combustion process are overheating of the burner—this can destroy the metal and constant use will eventually result in failure of the burner. Embodiments of the process of the present invention use submerged combustion to transfer heat directly from the burner to the surrounding waste water material to enable a long lifetime. The combustion chamber has an insulated inner shell to provide a superheated thermal mass to ensure complete oxidation of fuels—this shell may be designed using more expensive alloys or titanium that can resist the rigors of high heat. A second outer wall in direct contact with the surrounding water may then be constructed from less exotic metals. Exothermic reactions and oxidizers can replace the hydrocarbon reaction in the chamber and produce pure steam and carbon dioxide for steam-shift processes. With minor modifications to the valve or valveless intake ports. The inner wall may comprise a catalyzing material such as combinations of ceramic catalysts molded into the required combustion chamber shape. Timed resonance can be specific for certain reactions by using injectors and timing their frequency of fuel delivery to a specific resonance. When using gases and oxidizers or other reactants, a mechanical valve or standard reed-type valves can work, or a sodium-filled valve can be used on the intake port. The normally-closed position is used in most pulse jet engines but the use of a focused shock wave can be used to close a normally-open valve, thus allowing longer life valving for these gas expansion pulse jet engines and devices.

Other shortcomings of prior art pulse jet type combustion burners are loud noise from the rapid expansion in the combustion chamber and loud closing of the air inlet valves. The vibration of the wall in the combustion tube is dampened by the thermal transmission to the surrounding water and the gases around the tube formed by seam bubbles also create a sound-insulating effect as the sound energy disperses into the surrounding bath. This sound wave also aids in the dissociation of molecules in the distillation/separation process.

By modifying the fuel-air ratio and the tube diameters and lengths, thereby increasing or decreasing the back pressure, different harmonics can be achieved to enhance production. The optimum frequency may be experimentally determined at which energy flow is maximized for increased production. The use of sound, heat, and resonance vibration from the shock wave induces a separation that can produce an optimized balance of products. The pressure pulse in the system may be used to enhance particular chemical reactions or processes that are pressure-sensitive. A second process chamber may be used to increase thermal production and higher pressures, accepting the high velocity gases from the burner and passing them through a "ram induction Venturi" afterburner with thermal oxidizing agents and the injection of additional fuel to increase pressure and gas velocity in this second processing chamber for increased efficiency.

The superheated exhaust gases pass into a thermal catalytic chamber where liquid and gases may be processed using various catalysts. If water is to be processed, the resulting steam can be reformed by passing it through, along with the byproducts of combustion, to make hydrogen. This gas can aid in solvent recovery of heavy oil and bitumen, and tar sands recovery processes at the same time, providing pure distillate for these extraction processes and EOR processing. Gases then exit the system and pass through a dryer where superheated gases are cooled and saturated gases give up their heat when liquids from the main tank are sprayed into them to crystallize the solids in the dryer. More liquid is added to the main tank to maintain gas pressure equilibrium and proper balance of suspended solids. Gases the pass back into dispersion tubes to further evaporate liquid to make concentrate for the dryer. Gases are now fully saturated and pass into the distillate recovery section, or can be passed into the atmosphere. Gases are at 193° F., and are fully saturated with deionized water droplets. These microdroplets are very difficult to accumulate. Removing the thermal energy by converting the heat to electrical energy as they pass over thermal-electric Seebeck effect plates creates electrical energy while simultaneously cooling the gases. This electrical energy is used to keep batteries charged and to run electronics and/or to supply supplemental energy to the metals recovery plates at the bottom of the main chamber.

LISTING OF NUMBER CALLOUTS IN FIGURES

Figure 2D:
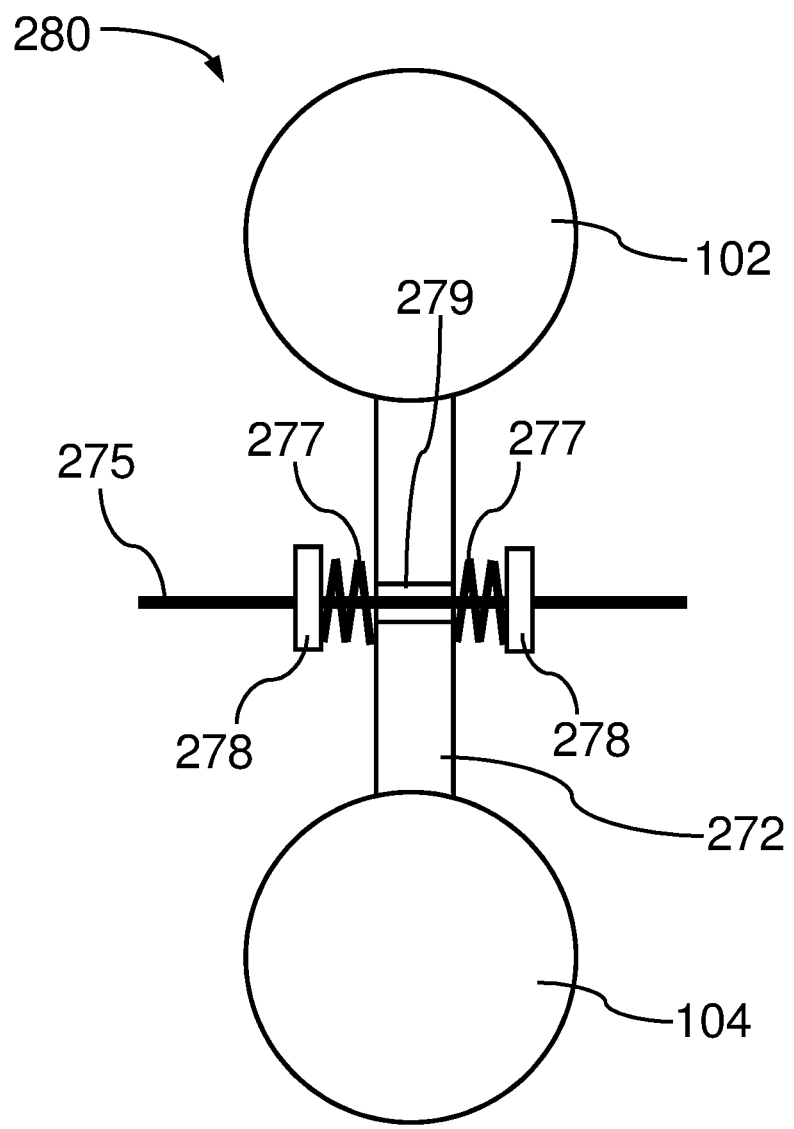
FIG. 2D is a detail end view of the spring-loaded support for the pulse jet in the burner chamber.
Figure 3A:
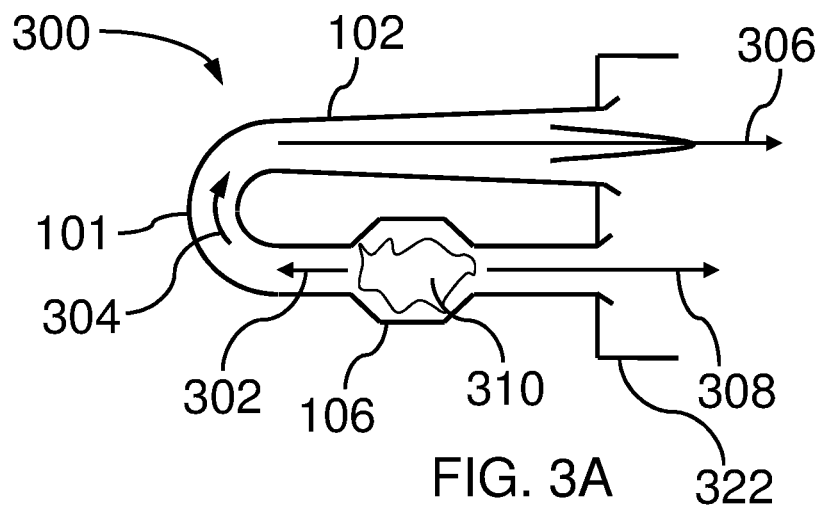
FIGS. 3A-3E illustrate various steps in the operation of a pulse jet burner.

In FIGS. 1 through 14, the following number callouts are used:
100 schematic end view of chamber #3 (burner chamber)
101 pulse jet elbow
102 pulse jet outlet cone
104 pulse jet outlet tube
106 pulse jet combustion chamber
107 pulse jet outlet flange
108 pulse jet inlet tube
109 support plate
110 outlet cone
111 support plate
112 pulse jet inlet cone
113 pulse jet outlet pipe elbow flange
114 boundary layer in outlet cone
115 chamber #3 inner wall (between chamber #3 and supercharger box)
116 pulse jet outlet flame
117 steam eductor
118 pulse jet inlet boundary layer
120 fan for pressurizing supercharger chamber
122 barrier between chambers #3 and #2
124 exhaust gas from pulse jet outlet to larger pipe to dry solids processing chamber
126 exhaust gas from pulse jet inlet to smaller pipe to dry solids processing chamber
130 entrance cone for larger pipe to dry solids processing chamber
131 tuning cone on larger pipe
132 larger pipe to dry solids processing chamber
133 tuning cone on smaller pipe
134 entrance cone for smaller pipe to dry solids processing chamber
136 smaller pipe to dry solids processing chamber
138 exhaust gas from pulse jet outlet
140 exhaust gas from pulse jet inlet
142 temperature sensor
148 air from fan into supercharger chamber
150 close-up view of pulse jet combustion chamber
152 chamber #3 outer wall
155 heat flow outwards from combustion chamber to surrounding water
163 thermal insulator between inner and outer walls of pulse jet combustion chamber
165 inlet centering cylinder of pulse jet combustion chamber
166 outlet centering cylinder of pulse jet combustion chamber
167 back wall of pulse jet combustion chamber
169 front inner wall of pulse jet combustion chamber
172 fuel line to flame cup
174 flame cup
175 fuel injection hole
176 fuel line into combustion chamber
177 fuel line to pulse jet fuel injector collar
180 fuel line into boundary layer within cone 112
186 glow plug/spark plug for pulse jet
188 pulse jet fuel injector collar
192 air-fuel mixture flowing within walls of cone
194 air flow into fuel pulse jet injector
195 air flow within pulse jet fuel injector
196 fuel flow into pulse jet fuel injector
197 pulse jet outlet flange
200 Section A-A cross-sectional view (from FIG. 1A)
204 pulse jet outlet tube
205 pulse jet inlet tube
206 steam in volume above water in chamber #3
208 water-steam interface level in chamber #3
214 water in chamber #3
215 heat flow outwards from outlet tube to surrounding water
218 interior of outlet tube
224 heat flow outwards from combustion chamber to surrounding water
228 pulse jet combustion chamber combustion region
240 top view of chamber #3
242 support slider
244 U-track
248 Teflon coating on wall of chamber #3
250 outer wall of chamber #3
270 side view of chamber #3
272 vertical support 274 support spring assembly
275 support rod
277 spring
278 push plate
279 clearance hole in vertical support
280 close-up view support bushing assembly
300 schematic diagram of pulse jet in an explosion phase
302 exhaust gases towards outlet cone during explosion phase
304 exhaust gases in elbow during explosion phase
306 exhaust gases from outlet cone during explosion phase
308 exhaust gases from inlet cone during explosion phase
310 explosion in combustion chamber
320 schematic diagram of pulse jet shortly after the explosion phase
322 wall of supercharger chamber
323 weakening flow out of combustion chamber towards outlet cone shortly after exhaust phase
324 weakening flow within elbow shortly after exhaust phase
326 weakening exhaust flow from outlet cone shortly after explosion phase
328 weakening exhaust flow from inlet tube shortly after explosion phase
330 underpressure region in combustion chamber shortly after explosion
340 schematic diagram of pulse jet just before the fuel injection phase
342 air flowing into combustion chamber from outlet tube
344 air flowing into combustion chamber in elbow
346 exhaust gases flowing out of outlet cone
348 air flowing into combustion chamber from inlet tube
350 underpressure region in combustion chamber shortly before fuel injection
360 schematic diagram of pulse jet in the fuel injection phase
362 air flowing into combustion chamber from outlet tube
364 air flowing into combustion chamber in elbow
366 exhaust gases flowing out of outlet cone
368 air and fuel (if fuel injection collar 188 is used) flowing into combustion chamber through inlet tube
370 air and fuel mixture prior to ignition
372 fuel injection into combustion chamber
380 schematic diagram of pulse jet in the explosion phase after FIG. 3A
382 exhaust gases towards outlet cone during explosion phase
384 exhaust gases in elbow during explosion phase
386 exhaust gases from outlet cone during explosion phase
388 exhaust gases from inlet cone during explosion phase
390 explosion in combustion chamber (next after combustion 310)
400 schematic isometric cutaway view of chambers #1-#3
402 chamber #3 (burner chamber)
404 chamber #2 (condenser chamber)
406 chamber #1 (coalescent chamber)
408 steam eductor
414 water-steam interface level in chamber #2
416 water-steam interface level in chamber #1
420 coagulator plates
421 inlet pipe for contaminated water (initial introduction of contaminated water to the system)
423 porous barrier between initial contaminated water in chamber #1 and cleaner water in chambers #2 and #3
436 flow of contaminated water between coagulator plates
437 downward flow of steam in coagulator
440 bubble bursting at the surface
456 heat exchanger tube
457 manifold for heat exchanger tubes
462 flow of sludge into auger
464 concentrated contaminants in water
470 condensed steam droplet
472 steam bubble forming on outside of heat exchanger tube
473 expansion of flue gas emerging from pipe 542
474 condensate in heat exchanger tube
475 motion of rising bubble
476 hot flue gas emerging from pipe 542
477 bubble scraping off steam bubble from outside of heat exchanger tube
478 expansion of bubble heated by heat exchanger tube
479 expansion of rising hot bubble
480 contraction of cooling bubble
481 micro-droplets within cooling bubble
482 flow of heat from flue gas bubble into water
483 cooled-off bubble no longer expanding
484 cooled-off bubble starting to contract before reaching heat exchanger tubes
485 motion of rising bubble
486 expansion of bubble being heated by heat exchanger
487 smaller bubble due to larger bubbles of flue gas breaking up
488 flow of heat from heat exchanger tube into water
496 oil separated out of contaminated water in chamber #1
500 schematic cross-sectional view of chambers #1-#3
502 flow of steam from chamber #3 into heat exchanger in chamber #2
504 demister #1
506 flow of demisted steam and flue gas out of demister #1
508 flow of light ends out of chamber #1
510 water feed tube from clarifier
512 flow of energy from chamber #3 to chamber #2: heat and vibration
514 electrolytic plates for metals removal from solution
540 flow of water up towards pulse jet burner (steam generation)
542 pipes bringing gas from outlet of chamber #4
553 skimmer pipe out of chamber #1
555 flow of skimmed oil out of chamber #1
564 outlet pipe for concentrates
565 flow of concentrates in outlet pipe (to injector 722)
582 auger tube
583 auger screw
584 output of solid waste driven by auger
591 outlet manifold from condenser in chamber #2
600 close-up cross-sectional view of a condenser pipe in chamber #2
602 outer wall of condenser pipe
604 inner wall of condenser pipe
606 flow of latent heat energy from condensing steam inside condenser pipe to boil water outside condenser pipe
608 inner volume of condenser pipe
610 condenser pipe wall
612 water outside condenser pipe in chamber #2
700 schematic cross-sectional side view of chamber #4—dry solids processing chamber
701 exhaust gas plenum
702 flow of gases out of demister #1
703 flow of gases into demister #1

706 chamber #4 outer wall
708 inner wall of chamber #4
709 water flowing into steam generating tubes in chamber #4
710 vortex of steam+flue gas+dried solids
711 water inlet pipe to chamber #4
712 inner volume of chamber #4
713 steam generating tube
714 inlet pipe for flue gas from inlet tube of pulse jet (after passing through supercharger box 122)
715 flow of flue gas in pipe 714
716 dried solids flowing out the bottom of chamber #4
718 dried solids flowing out of chamber #4 in pipe 720
719 auger for dried solids
720 bottom outlet pipe for dried solids from chamber #4
722 auger screw
723 dry solids from bottom of chambers #1-#3 being fed into auger
724 auger tube
726 secondary dryer
728 vortex flow of material, steam and flue gas within dryer
730 outlet pipe from chamber #4 wall (contains flue gas)
731 throttle valve on flue gas line into dryer
733 dried solids (broken into small pieces by flue gas jet) flowing into chamber #4 for further drying
735 inlet pipe from dryer to chamber #4
738 inlet pipe for flue gas from outlet cone of pulse jet (after passing through supercharger box 122)
739 flow of flue gas in pipe 738
741 Venturi tube
742 Condensate injection pipe
743 Condensate from 565
744 throttle valve on steam line into dryer
746 steam flow into dryer
747 flue gases flow into dryer
748 steam line into dryer
750 clumps of wet solid waste
751 broken up small particles of wet solid waste
780 flue gas inlet line to secondary dryer
790 condensate injection pipe
792 condensate from 565
798 catalysis plate (iron, etc., decomposes reactive gases such as CO+water into CO2 and hydrogen)
799 top of chamber #4
800 schematic end view an alternative embodiment of chamber #3
802 tuning cone on larger pipe
804 tuning cone on smaller pipe
806 gas flow in larger cone
808 gas flow in smaller cone
810 injection of fuel and/or air and/or oxygen for secondary burning
812 injection of fuel and/or air and/or oxygen for secondary burning
892 in and out motion of tuning cone 802
894 in and out motion of tuning cone 804
900 close-up schematic diagram of the coagulating plates in chamber #1
901 electrical insulator between coagulator plates
903 inward flow of vapor and condensate from the condenser in chamber #2
904 outlet manifold
905 inlet manifold
906 outward flow of vapor and condensate from between the coagulator plates
912 coagulator bipolar power supply
914 P1 connection from coagulator power supply
916 −P1 connection from coagulator power supply
1000 floating dome digester
1002 methane output pipe
1004 methane from digester: 1) fuel, and/or 2) product
1006 methane produced by digestion of sludge
1008 upper portion of heater coil
1009 lower portion of heater coil
1010 sludge
1011 convection due to heating coils
1012 outer wall of floating dome digester
1014 floating dome
1016 vertical motion of floating dome on digester
1017 flue gas
1018 inner float ring
1019 separated flue gas
1020 methane bubble
1021 flue gas collection pipe
1023 auger for sludge
1024 bottom outlet pipe for sludge from chamber #5
1025 sludge output from digester
1026 outer float ring
1050 close-up schematic diagram of heating coil detail in floating dome digester
1051 liquid carry-over preventer
1052 condensate blocked by liquid carry-over preventer
1053 vapor passing through liquid carry-over preventer
1054 flue gas exiting from heater tube above liquid carry-over preventer
1055 downward flow of condensate
1100 schematic diagram of the operation of chamber #2
1200 schematic diagram of the Peltier power generation system
1202 accumulator tank
1204 storage tank
1206 cooler fluid from accumulator tank 1202
1208 hotter fluid entering storage tank 1204
1210 cooled gases exiting heat exchanger #1
1212 hot gases into heat exchanger #1
1214 Peltier power generator
1220 output from Peltier power generator (to electro-coagulators)
1222 gases being cooled in heat exchanger #1
1224 liquid being heated in heat exchanger #1
1226 air for pulse jet being heated in heat exchanger #2
1228 condensate line out of heat exchanger #1
1229 flow of condensate out of heat exchanger #1
1230 condensate in heat exchanger #1
1300 schematic diagram of the clarifier
1302 liquid inlet line from chamber #1
1304 liquid input from chamber #1
1305 light ends from clarifier
1306 clarifier chamber
1308 oil output from clarifier
1310 water output from clarifier
1312 liquid flowing over baffle into main clarifier chamber
1314 baffling plates
1400 schematic diagram of the wet scrubber subsystem
1402 nozzle
1404 water pump
1406 gas flow from heat exchanger #1
1407 alternative insertion location for gas flow from heat exchanger #1
1408 water flow out of accumulator tank
1410 Venturi
1411 accelerated gases in Venturi 1412 water flow pumped to nozzle
1414 gases venting
1415 absorption scrubber
1416 scrubbed gases venting
1417 cold water in accumulator tank FIG. 1A is a schematic cross-sectional view 100 of the burner chamber #3 402. See also FIGS. 1B, 1C, 4 and 5. The purposes of the burner chamber are the following:

1) Generate steam 502 which goes to chamber #2 404,
2) Generate heat transfer 512 to chamber #2 404 through wall 122,
3) Generate pulsing energy conducted through the fluid out the bottom of chamber #3 to chambers #2 and #1 406, as well as through wall 122 to chamber #2 404, and
4) Generate superheated exhaust gas which passes through the supercharger box and then into the dryer (chamber #4).

Structural Elements of the Pulse Jet Burner

The pulse jet is completely submerged in water. Normal pulse jet engines operate in air in order to maintain sufficiently high wall temperatures to maintain the pulsed combustion process. The pulse jet in embodiments of the present invention may have a double-wall structure enabling an inner wall to remain at sufficiently high temperatures to maintain combustion, but where an outer wall remains substantially cooler, but still above boiling temperature at atmospheric pressure.

Air and (optionally) fuel enters from the supercharger box through inlet cone 112 leading to inlet tube 108. A boundary layer 118 is established on the inner wall of the cone 112 and tube 108. Superheated exhaust 116 exits into supercharger box through the outlet cone 102 with exit cone 110 at the entrance to the supercharger box Fuel Injection Multiple possible methods for fuel injection into the pulse jet (not mutually-exclusive) fall within the scope of the invention:

a. Fuel may be injected 180 into the boundary layer 118 of the entrance cone 112 [FIG. 1A].
b. Fuel may be injected 172 into the airflow with a spray bar 174 [FIG. 1B].
c. Fuel may be injected through tube 177 using a fuel injector collar 188 [FIG. 1B with details in FIG. 1C]. In this scheme, air 194 in injected into the collar and flows 195 past where the fuel is injected 196 forming an air-fuel mixture 192 which combines with the main inlet air flow 368.
d. Fuel may be injected through tube 176 into the space between the inner wall and the outer wall to preheat the fuel before burning [FIG. 1B], and then into the chamber through a multiplicity of holes 175.
e. Other locations are also possible for fuel injection as maybe understood by those skilled in the art.

Combustion Chamber

The combustion chamber 106 has a novel double-walled design shown in more detail in view 150 for the following purposes:

a. Inner wall (comprised of sections 165, 166, 167, 169) may be formed from catalytic high-temperature metals to facilitate the burning process, enclosing the combustion chamber 228. The inner wall may be separated from the outer wall by thermally-insulating spacers 163. Fuel may be circulated in the space between the inner and outer walls to preheat the fuel prior to burning as described above. Proper functioning of the pulse jet burner requires that the inner wall in contact with the burning fuel is extremely hot (red to white hot). The inner wall may alternatively be molded out of ceramic materials with embedded catalysts, or formed by standard metal-forming processes. By separating the combustion chamber at the joint comprised of flanges 107 and 197, the inner wall may be removed for replacement or cleaning.

b. Outer wall 106 may be fabricated from stainless steel or other metal—it remains much cooler than the inner wall (although still hot enough to potentially generate steam) since it is in direct contact with the boiling water surrounding the pulse jet burner. Heat 155 is conducted from the inner wall to the outer wall by convection and radiation to the outer wall, and then into the boiling water surrounding the pulse jet burner.

Benefits of Pulse Jet Burners Over Conventional Burners

A pulse jet, and in particular the valveless pulse jet shown here, has the substantial advantage of not requiring a blower (typically up to 25 horsepower) to draw air into the combustion chamber, since the pressure waves within the outlet and inlet tubes serve this function. The combustion chamber must be at an extremely high temperature to induce combustion of the fuel in periodic pulses. FIG. 3A-3E discusses the operation of a valveless pulse jet. Since the pulse jet in the present invention is completely submerged in water, the outer wall of the combustion chamber is separated from the inner wall which is exposed to the burning fuel in—thus the outer wall may be hot enough to generate steam but can still be much cooler than the red to white hot inner wall. Another advantage of a pulse jet is the oscillatory pressure waves which propagate out into the water in chamber #3 and then to chambers #2 and #1 both through the water connection at the bottom of chambers #1-#3, as well as through the separating wall 122 between chambers #3 and #2. Many coagulation processes in both chambers #1 and #2 may be enhanced by this periodic increased pressure in the fluid.

Supercharger Box

The supercharger box adjoins the liquid-filled burner chamber at the right of FIG. 1A, and is separated by a support wall 115. A fan 120 generates air flow 148 may be used to pressurize the supercharger box up to at least 2-3 atmospheres pressure, thus enabling both increased combustion efficiency in the pulse jet as well as providing a means for controlling the power output from the pulse jet (by regulating the fan 120 speed and thus the degree of overpressure within the supercharger box). The superheated exhaust gases 124 and 126 from the pulse jet burner enter two tubes 132 (flow 138 entering entrance cone 130) and 136 (flow 140 entering entrance cone 134) which lead this gas out of the supercharger box to chamber #4 for drying of waste materials (see FIG. 7). FIG. 8 shows an alternative embodiment of the supercharger box.

At the entrance cone 130 of the larger pipe 132, a steam eductor 117 may optionally be located. At the entrance cone 132 of the smaller pipe 134, another steam eductor 117 may also optionally be located. The function of the steam eductors is to increase the pressure and velocity of the gases flowing out of the supercharger box into chamber #4, thereby enhancing the generation of vortex air flow (see FIGS. 7A-7C).

Within larger pipe 132, a first tuning cone 131 may be located; within smaller pipe 136 a second tuning cone 133 may also be located. The functioning of these cones is described in the discussion of FIG. 8. In this embodiment, the tuning cones are within the pipes 132 and 136, while in the embodiment in FIG. 8, the tuning cones are at the exit of the pipes 132 and 136.

Injection of Fuel and Oxidizers

Fuel may be introduced into the compressed air within the supercharger box, prior to flowing into the inlet tube of the pulse jet burner. In addition, oxygen may also be injected into the boundary layer in the entrance tube cone 112 to enhance the efficiency of the combustion process in chamber 106.

FIG. 1A shows an overall view 100 of chamber #3 where the pulse jet burner comprises:
- an inlet cone 112 leading to an inlet tube 108,
- a combustion chamber 106,
- an outlet tube 104, leading to an outlet elbow 101, which connects to an outlet cone 102 and then outlet cone 110,
- wall 115 separating the water-filled chamber #3 from the (air and gas-filled) supercharger box,
- outer wall 152 of chamber #3,
- pulse jet support plates 109 and 111,
- a boundary layer 114 formed inside exit cones 102 and 110,
- a boundary layer 118 formed inside inlet cone 112 and inlet tube 108,
- flanges 113 and 193 connect the outlet elbow 104 to the outlet cone 102,
- optional steam eductors 117 at the entrance cones 130 and 134,
- optional tuning cone 131 in larger pipe 132
- optional tuning cone 133 in smaller pipe 136, and
- section A-A which is shown in FIG. 2A.

In some embodiments of the present invention, a forced-draft burner may be employed in place of the pulse jet burner.

Figure 1B:
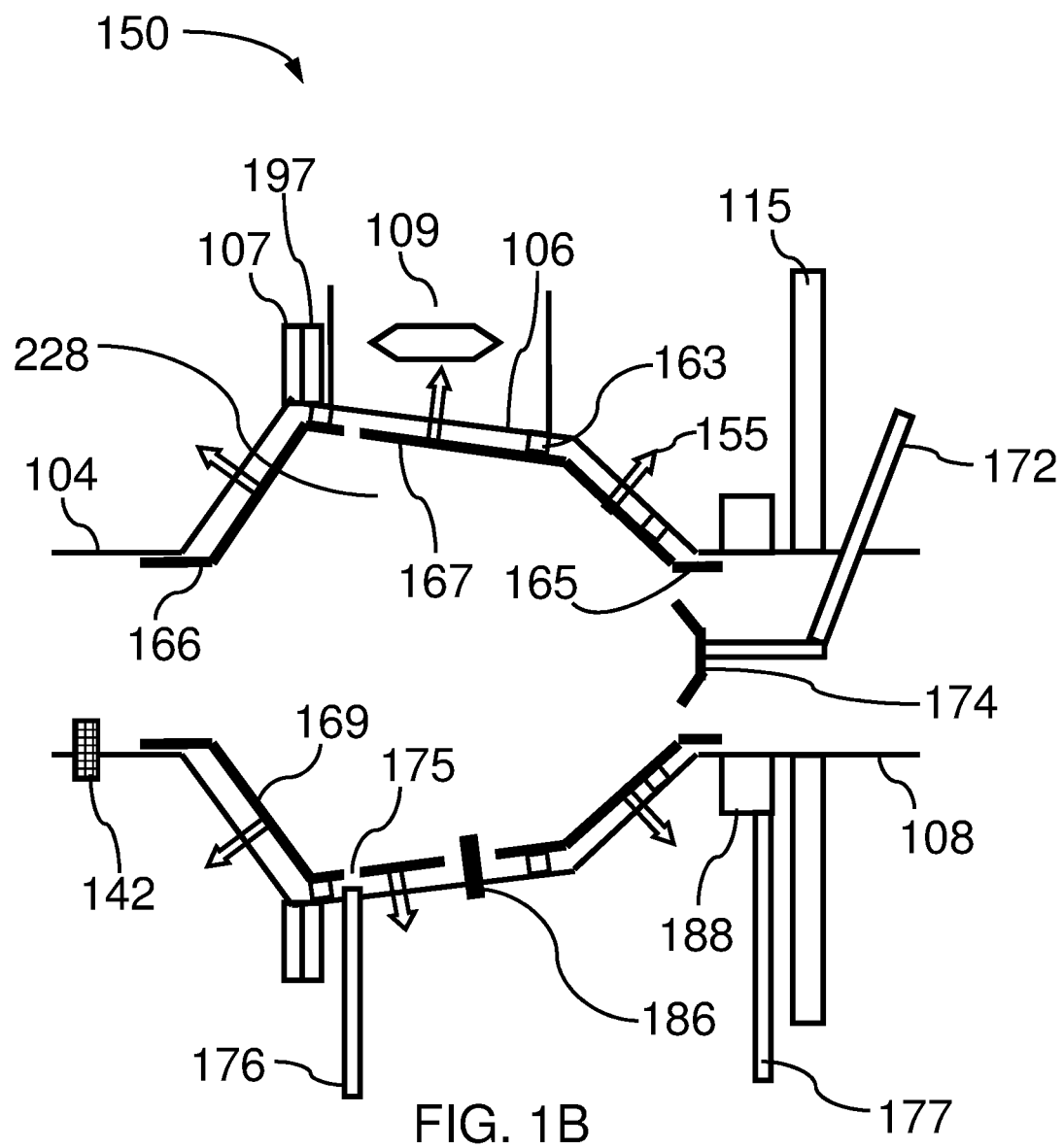
FIG. 1B is a schematic cross-sectional view of the combustion chamber of the pulse jet burner.

FIG. 1B is a schematic cross-sectional view of the combustion chamber of the pulse jet burner. The inner wall of the chamber comprises multiple separable parts: two cylindrical sections 166 and 165 which serve to align the inner wall and keep the inner-to-outer wall gap approximately uniform, a front conical section 169, and a rear section 167. The combustion chamber separates at flanges 107 and 197 to enable installation and removal of the inner wall, which due to high temperatures will require periodic replacement due to wearing effects. The inner wall may be comprised of high temperature metals (which may have catalytic properties to enhance efficient combustion) or of molded ceramics with embedded catalyst materials. Multiple methods and locations may be used for fuel injection as described in FIG. 1A above. A glow plug/spark plug 186 may be used to control fuel ignition, which is useful since the periodic fuel ignition induces pressure waves in the fluid which need to have a regular frequency for optimum benefit. A temperature sensor 142 on the output tube from the combustion chamber may enable real-time feedback control of the fuel input to the burner to regulate the burn rate and thus the output power and temperature.

Upon initial start-up of the system, typically propane may be used. After the system is running, wellhead gas may be added or substituted for the propane. Optionally, propane may be injected from one or more of the locations listed in FIG. 1A and the wellhead gas injected from the same location(s) and/or other location(s). Thus oils and gases recovered by the system from the waste water may be used to power the system in a self-contained operating mode.

Figure 1C:
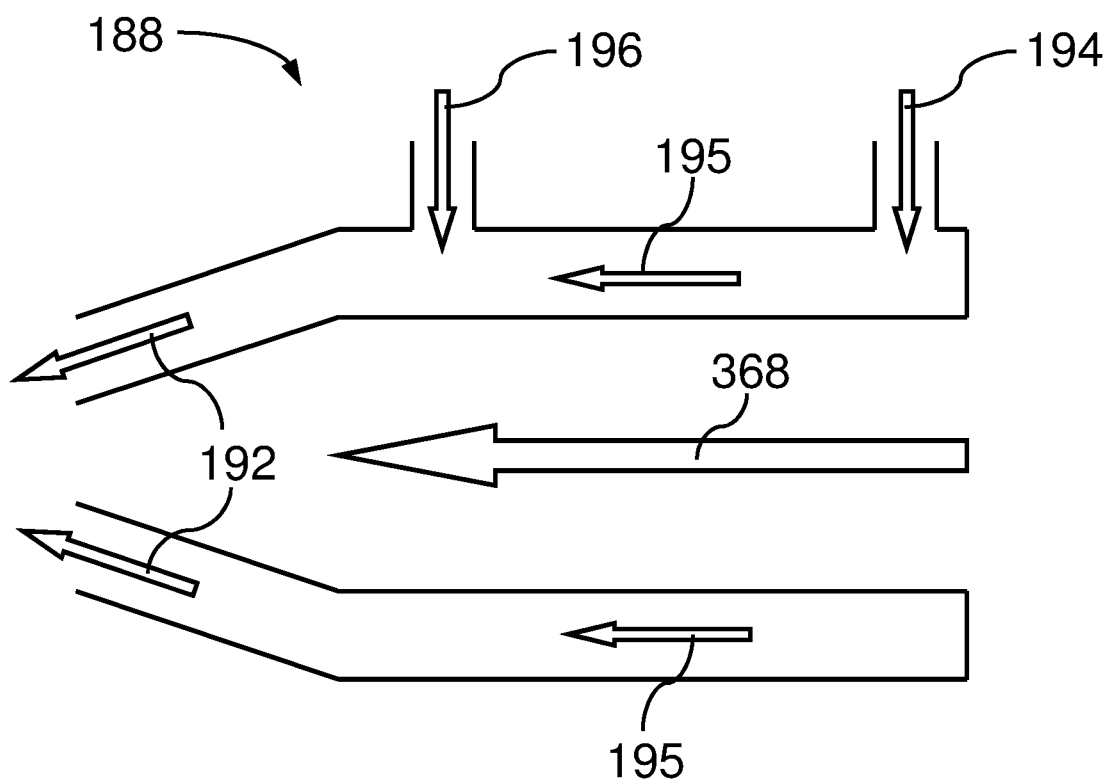
FIG. 1C is a schematic cross-sectional view of the fuel injector for the pulse jet burner.

FIG. 1C is a schematic cross-sectional view of the fuel injector 188 for the pulse jet burner. Air 194 is injected 195 upstream of the fuel 196, which are then mixed 192 in the injector prior to entering the combustion chamber inlet tube and combining with the air 368 being sucked into the pulse jet burner.

FIG. 2A illustrates 200 schematically section A-A of the burner chamber #3 in FIG. 1A-FIG. 1A illustrates the location of section A-A which passes through the output cone 204 (single-walled 102 since at this point the gases have cooled and a double-wall insulation is not required) at the top and the double-walled combustion chamber 205 at the bottom. The flow of heat and vibrational energy into the surrounding fluid is illustrated by arrows 215 and 224. Steam (either saturated or superheated) passes 502 to an array of heat exchanger tubes in chamber #2 (see FIG. 5). Outer wall 250 and barrier 122 (between chambers #2 and #3) contain water 214 and steam 206 where the water-steam interface 208 is maintained above the pulse jet.

FIG. 2B illustrates schematically a top view 240 of the sliding support structure for the pulse jet in chamber #3 (the "burner chamber"). The support structure for the pulse jet burner is illustrated in FIGS. 2B-2D and serves the following functions:
1. Mechanical support for the pulse jet burner,
2. Spring-loaded mounting to the support to allow for thermal expansion of the pulse jet during operation, and
3. Spring-loaded mounting to reduce damping of the pulse jet vibration—this enables the vibratory energy from the pulse jet to flow into the surrounding water medium, and then on into chambers #2 and #1, both directly through the fluid at the bottom of chambers #1-#2 and also through wall 122 into chamber #2.

The top view in FIG. 2B shows four sliders 242 in tracks 244—as the pulse jet expands after heating, these sliders may slide along tracks 244 (to the left of the figure) to accommodate the thermal expansion and avoid buckling of the tubes.

FIG. 2C is a schematic end view 270 of the sliding support structure for the pulse jet in the burner chamber. The sliding mechanism in FIG. 2B may be seen in an end view here. Vertical support 272 connects together the upper (outlet cone 102) and lower (inlet tube 104 and combustion chamber 106) sections of the pulse jet burner. Support rod 275 is connected to vertical support 272 by a support spring assembly 274 shown in more detail 280 in FIG. 2D. The sides of barrier 122 and outer wall 250 facing inwards may have a Teflon coating 248 to facilitate cleaning and reduce adhesion of contaminants.

FIG. 2D is a detail end view 280 of the spring-loaded support for the pulse jet in the burner chamber. Vertical support 272 which connects the upper and lower sections of the pulse jet burner is flexibly attached to support rod 275 (which extends across through clearance hole 279) by the spring-loaded support comprising dual springs 277, which separate the vertical support 272 from the dual push plates 278, thereby centering the pulse jet burner within the burner chamber #3, while still enabling the benefits listed in FIG. 2B above.

FIGS. 3A-3E illustrate various phases in the operation of a valveless pulse jet burner. Details of the specific benefits of applying a pulse jet burner to the present invention are described in FIG. 1A above.

FIG. 3A illustrates 300 the pulse jet in the explosion phase. A preferred notation is "deflagration", rather than the informal term "explosion", since the combustion process is not as violent as that found in pulse detonation engines (PDEs). The fuel-air mixture is burning (exploding or deflagrating) 310 in the combustion chamber 106, and as a result accelerated hot gases are flowing 308 out of the inlet tube. Accelerated hot gases are also flowing 302 and 304 through elbow 101 and then flowing 306 out of the outlet cone 102. Hot gases 306 and 308 flow into the supercharger box with wall 322.

Figure 3B:
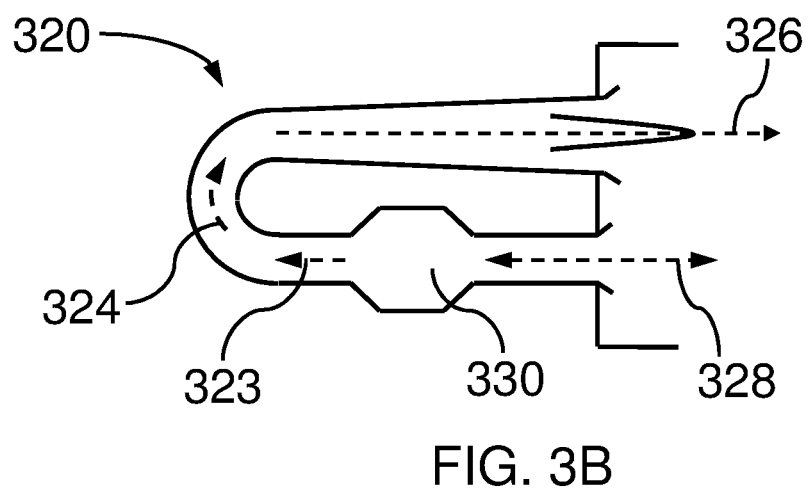

FIG. 3B illustrates 320 the pulse jet shortly after the explosion phase, when the gas pressures are dropping, producing an underpressure region 330 in the combustion chamber 106. The accelerated hot gases exiting from the inlet tube slow and eventually change direction 328, now entering the combustion chamber to supply air (and in some cases fuel, depending on the location of the fuel injection—see above in FIG. 1). The accelerated hot gases 323, 324, and 326 also slow as the pressure in the combustion chamber drops, however they do not reverse direction as shown—due to the larger air mass in the (much longer) outlet tube and cone, the time until the gas reverses direction (see FIG. 3C) is much longer.

Figure 3C:
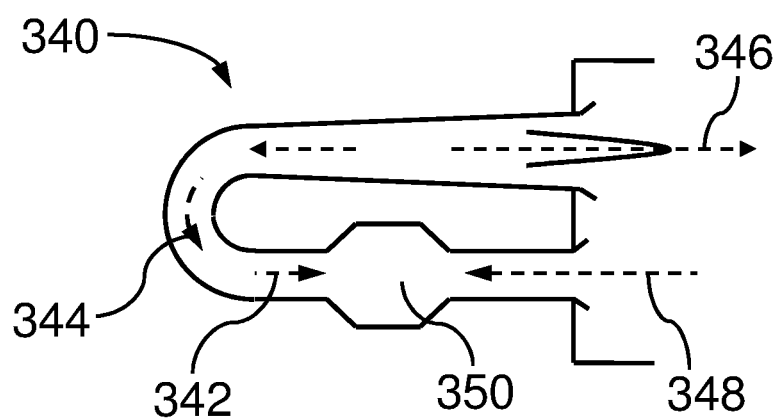

FIG. 3C illustrates 340 the pulse jet shortly before the fuel injection phase. By now the pressure 350 in the combustion chamber 106 has dropped much lower than in FIG. 3A, and the gas flows in both the inlet (flow 348) and outlet (flows 342 and 344) are inwards towards the combustion chamber. Flow 346 at the outlet cone is shown going outwards—in some cases the direction of flow 346 may be inwards (at relatively low velocities) as well.

Figure 3D:
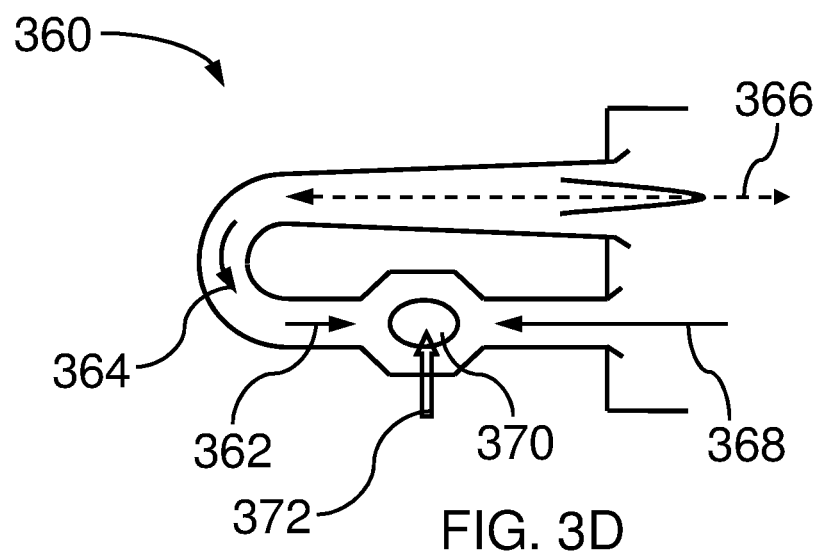

FIG. 3D illustrates 360 the pulse jet in the fuel injection phase, where fuel (or fuel and air) are injected with one or more of the methods listed for FIG. 1 above. For example, fuel 372 (injection mechanism not shown) is being injected into combustion chamber 106 where it mixes with the incoming air from the inlet and outlet. By the time the fuel injection phase starts, the air flow 368 from the inlet, and the air flow 362 and 364 from the outlet are stronger and air flow 366 may be nearly stopped or also inwards.

Figure 3E:
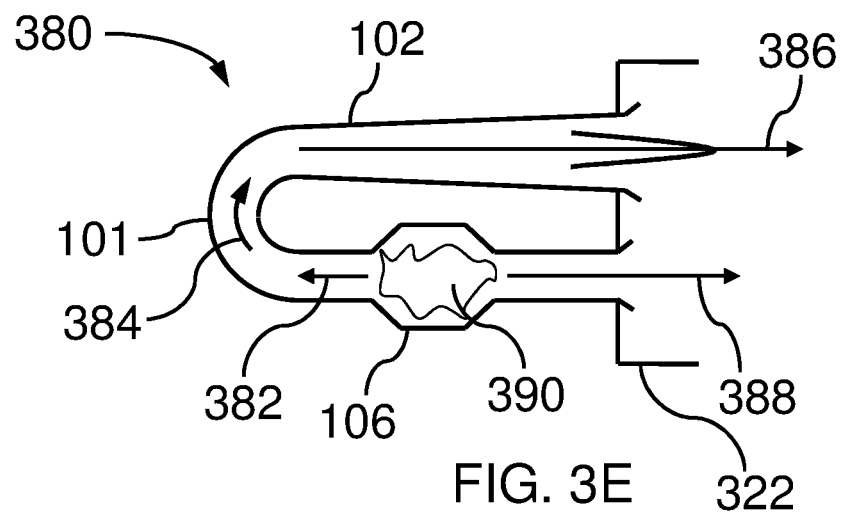

FIG. 3E illustrates 380 the pulse jet in the next pulse jet phase after that illustrated in FIG. 3A. The fuel-air mixture is burning (exploding) 390 in the combustion chamber 106, and as a result accelerated hot gases are flowing 388 out of the inlet tube. Accelerated hot gases are also flowing 382 and 384 through elbow 101 and then flowing 386 out of the outlet cone 102. Hot gases 386 and 388 flow into the supercharger box with wall 322.

Figure 4:
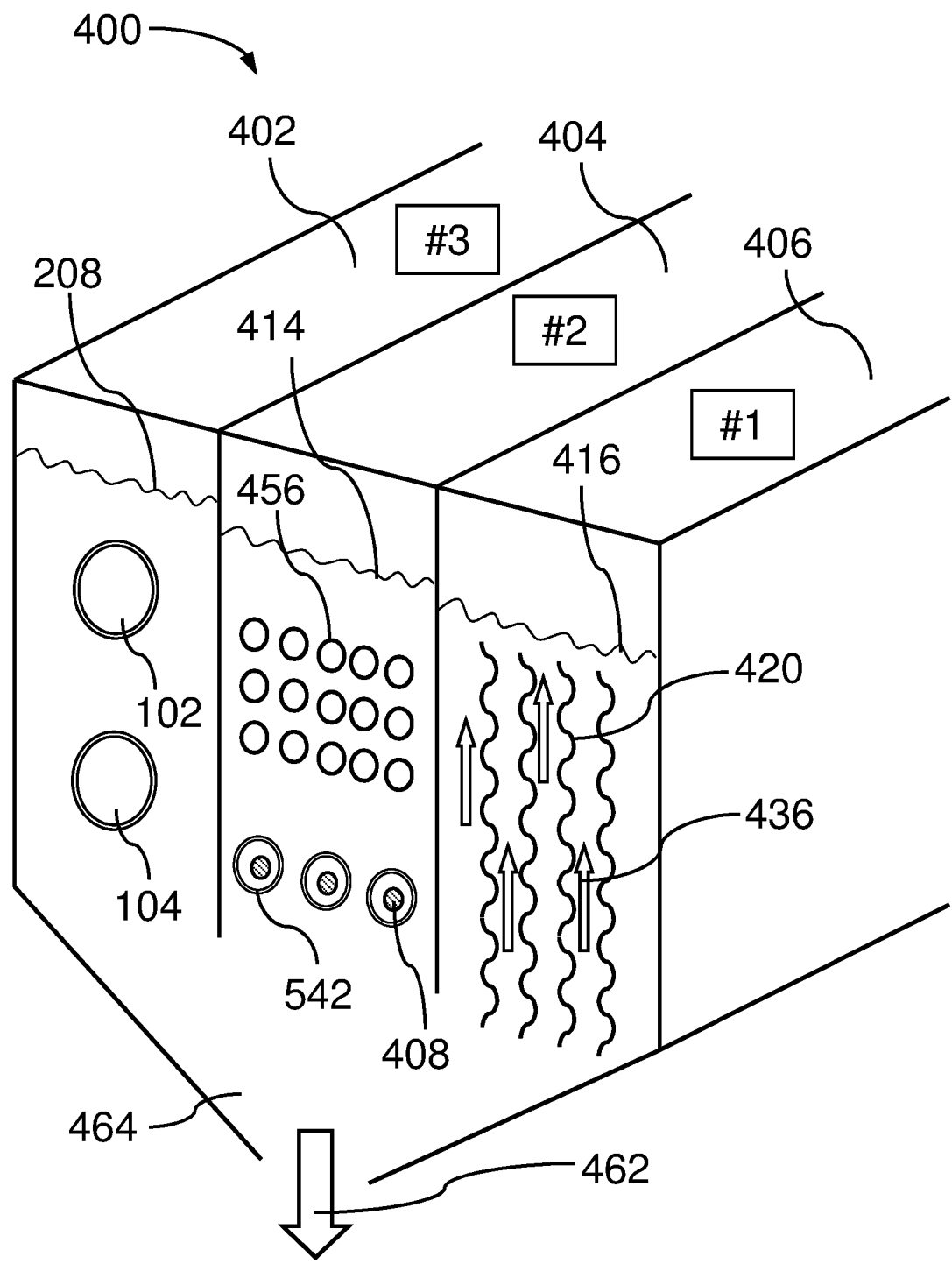
FIG. 4 is an isometric schematic view of chambers #1-#3.
Figure 5:
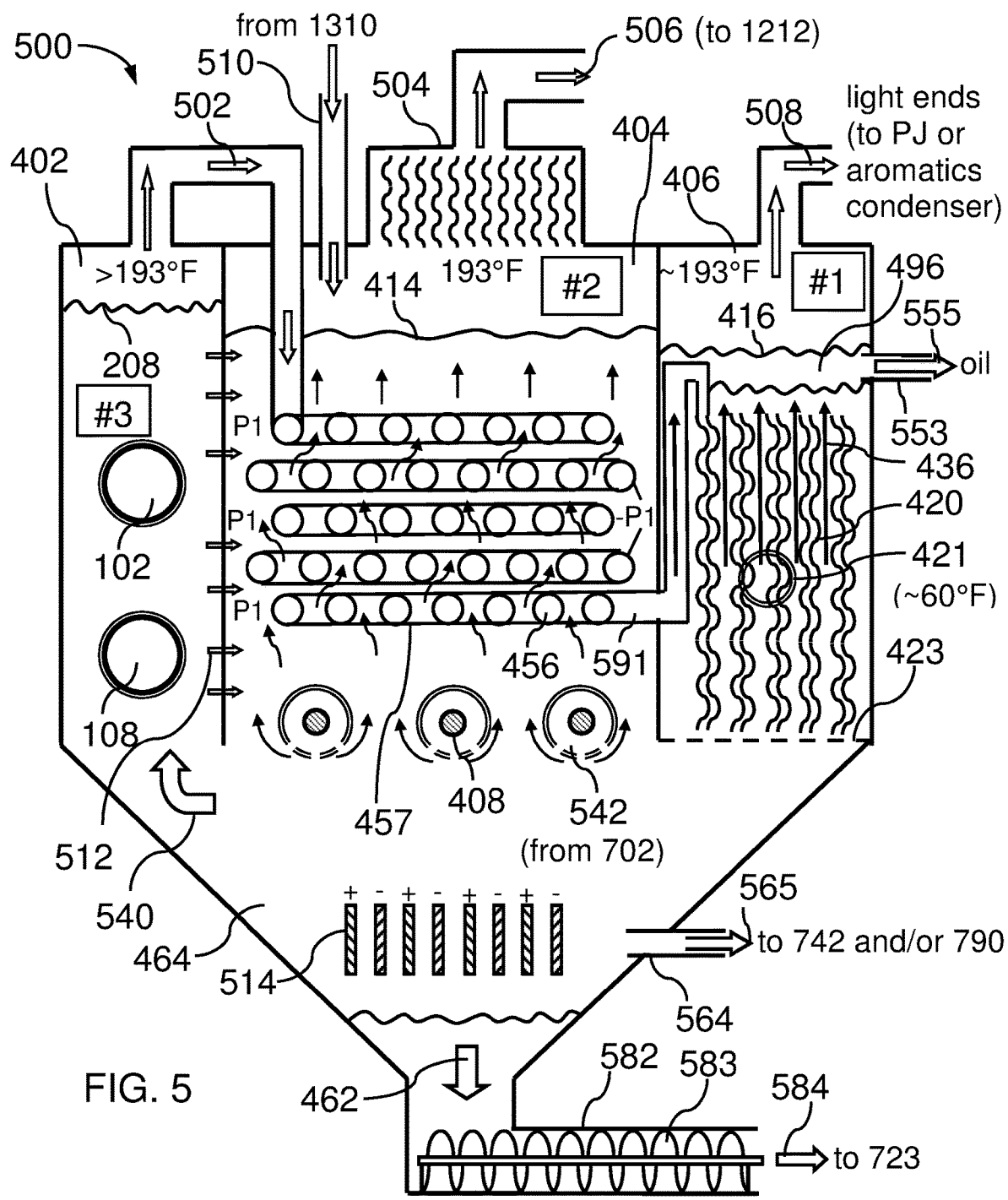
FIG. 5 is a cross-sectional schematic view of chambers #1-#3.

FIG. 4 is an isometric schematic view 400 of chambers #1-#3. FIG. 5 is a cross-sectional schematic view 500 of chambers #1-#3 as shown in FIG. 4. The following discussion refers to both FIGS. 4 and 5.

Alternative Pulse Jet Burner Configuration

FIG. 8 is a schematic side cross-sectional view 800 of an alternative embodiment of the pulse jet burner in chamber #3—this may be compared with FIG. 1A. The benefits of the pulse jet burner vibrations may be further enhanced using tuning of the pulse jet frequency by means of the two cones 802 and 804 illustrated here at the exits of tubes 132 and 136 connecting the supercharger box with the dry solids processing chamber #4—compare with the alternative embodiment shown in FIG. 1A. By moving cones 802 and 804 in and out 892 and 894, respectively, the Bernoulli effect controls the oscillation frequency of the pulse jet by regulating exiting gas flows 806 and 808, respectively, independently of the fuel flow to the pulse jet burner—this is unique to the present invention since in the prior art, no independent control of pulsing frequency and power output was possible. By varying the frequency and monitoring the rates and efficiencies of the various processes in chambers #2 and #1, optimization of these rates and efficiencies, and selection of competing processes, may be accomplished. It is also within the scope of the invention to inject fuel, air, or oxygen, or a combination of two or all of these 810 and 812, into the flows exiting from the larger 132 and smaller 136 pipes, respectively. The flexible mounting structure for the pulse jet illustrated in FIGS. 1A, 2B-2D (which may be applied to this alternative embodiment) may enhance the effectiveness of the oscillatory pressure waves from the pulse jet burner in chamber #3 to affect the chemical processes (especially coagulation) in chambers #2 and #1.

Chamber #3—Burner Chamber

The structure and operation of chamber #3 (the burner chamber) 402 is described above in FIGS. 1-3.

Chamber #2—Condenser or Heat Exchanger Chamber

The (center) heat exchanger (condenser) chamber 404 is both structurally and functionally very complex. At the top of chamber #2, an array of heat exchanger tubes 456 is connected together by manifolds 457. Each horizontal bank of heat exchanger tubes is electrically connected together, however the banks are electrically insulated from each other and are connected alternately (top to bottom) to a power supply providing equal magnitude and opposite polarity voltages P1 and −P1—these voltages may reverse polarity typically over time frames of a few minutes. The heat exchanger tubes receive steam 502 from the accumulated steam (at a temperature above 192° F.) above the water-steam interface 208 in burner chamber #3 as shown—this steam flows down through the banks of heat exchanger tubes, gradually transferring its latent heat to the surrounding fluid as illustrated and described in more detail in FIG. 11. The water-steam interface level 414 is lower than level 208 since the pressure in chamber #2 above the water-steam interface 414 is slightly higher than in chamber #3.

At the bottom of the heat exchanger tube array, the remaining steam and condensate flows out through manifold 591 and over to chamber #1, where it is used to heat the coagulation plates (see below). At the bottom of chamber #2, a replaceable array of plates (typically ferrite or other magnetic material) 514 is electrically biased (typically with alternating +30 and −30 V biases). These plates may have three different functions (not necessarily mutually-exclusive), depending on the types of contamination in the water: 1) removal of metallic ions out of solution, 2) magnetic removal of iron particles, and 3) hydrolysis of water to generate oxygen and hydrogen for enhancement of the chemical processes occurring in the upper regions of chamber #2. For some of these three applications, materials will deposit onto these plates—these bias voltages would be periodically reversed to prevent excessive build-up of deposited material. Plates 514 are configured to be easily removable to enable recovery of the valuable deposited metal from solution. In addition, when these plates react with the metallic solution, hydrogen-rich gas and oxygen are generate by the electrolytic decomposition of the water—this gas may be collected (optional collector not shown) or it may be allowed to bubble up through chamber #2 and then to pass through demister 504 into gas flow 506. The downward flow at the bottom of chamber #2 contains solid condensates, and more concentrated liquid waste water. Additional feed water 1310 from the clarifier (see FIG. 13) maybe supplied to chamber #2 through tube 510.

The chemical processes in chamber #2 are driven by all the sources of energy from chamber #3: steam heat, superheated exhaust gases, and vibration 512 from the pulsed periodic burning process. Calcium carbonate may be added (typically at the top of chamber #2) to perform the following functions:

1. Odor reduction, particularly in the case of "sour" waste material (high sulfur content),
2. Absorption of metallic gases, 3. Control of pH (typically preferred to be in the range 6.5 to 7.5), and
4. Binds $CO_2$.

Sludge 462 accumulates at the bottom of chamber #2, and an auger 582 and 583 may remove this sludge 584 which may be loaded 723 into the dryer in FIG. 7. Liquid condensate waste fluid 565 from the concentrated solution 464 at the bottom of chamber #2 may be removed through tube 564 for injection into the dryer in FIG. 7.

At the top of chamber #2, a demister 504 removes droplets entrained in the rising steam and exhaust gas mixture—the demisted gases 506 may then transmitted to the Peltier effect electrical power generator. Above the level of the accumulated sludge in the bottom of chamber #2, outlet pipe 564 removes concentrates 565 which are fed to the injector (see FIG. 7). As the pulse jet burner generates steam, replacement feed water 540 passes from chamber #2 into the bottom of chamber #3. At the bottom of chamber #2, larger pipes 542 feed hot gases from the outlet of chamber #4 (see FIG. 7). Optionally, iron nanoparticles may be added to condensate 565—these particles may enhance the processes occurring in chamber #4.

Within pipes 542, optional steam eductors 408 may be located. The function of the steam eductors is to enable initial start-up of the system by facilitating the removal of water from within pipes 542. During system operation after start-up, steam eductors 408 may continue to operate.

Figure 11:
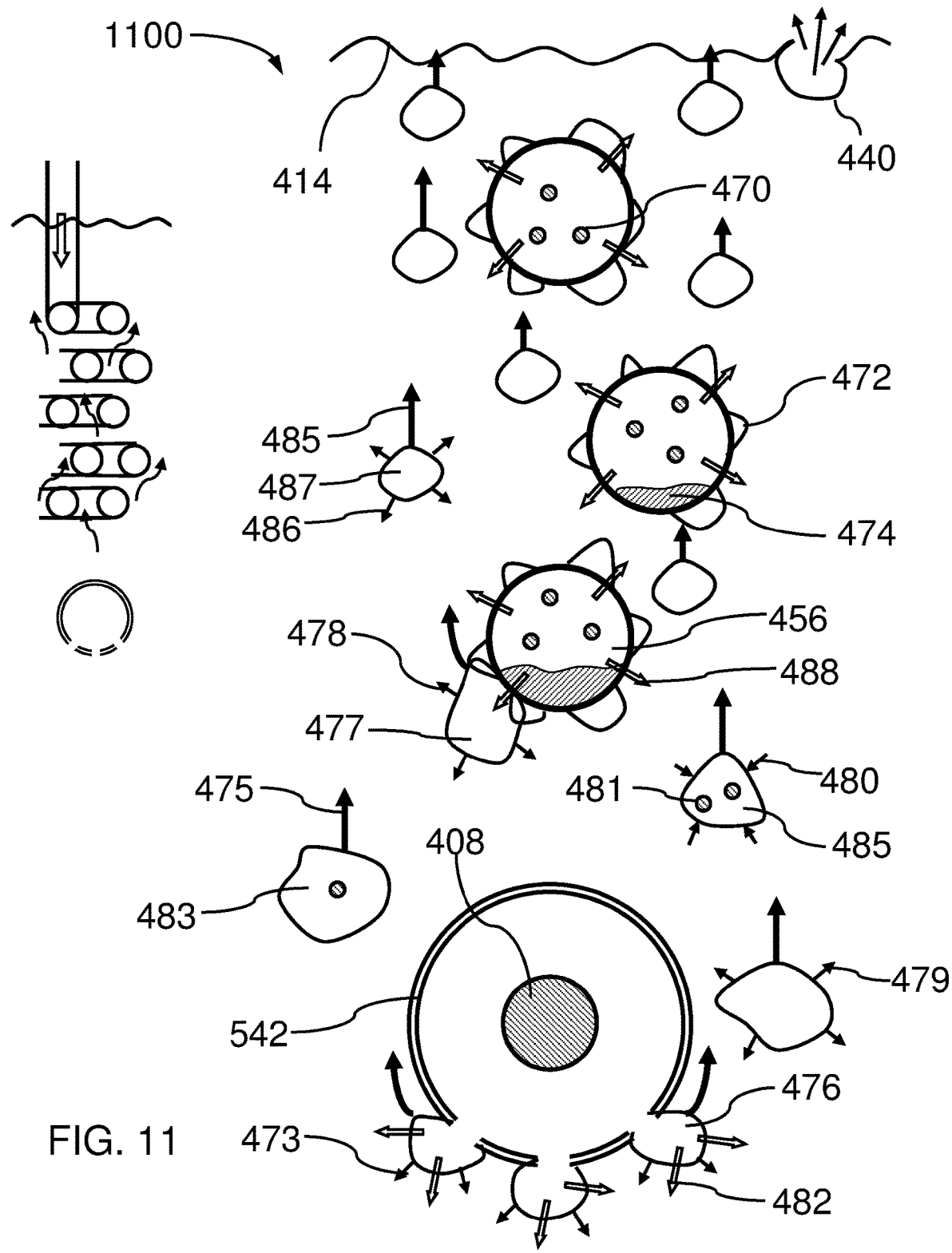
FIG. 11 is a schematic diagram of the operation of the heat exchanger chamber #2.

FIG. 11 is a schematic diagram of the operation of the heat exchanger chamber #2. At the left, the heat exchanger tube array and flue gas tubes 542 are shown. A very complex set of processes occurs in chamber #2. Tubes 542 are fed by hot gases 702 (see FIG. 7) exiting from the dry solids processing chamber #4. These superheated gases may contain flue gas, steam, carbon dioxide, nitrogen, etc. Tubes 542 have slotted vents in their lower surfaces—the positive relative pressure of the gases inside tubes 542 prevents backflow of water into tubes 542, thus the gas is shown exiting 476 from the tube to form initially large rising bubbles. Just after emerging from tube 542, these bubbles are hotter than the surrounding fluid, thus the flow of heat 482 is outwards into the water. Also the hot bubbles initially expand 473 and 479 outwards against the local water pressure. As the bubble rise, they cool both due to expansion and due to heat transfer into the surrounding water which is thereby heated. The hot walls of the bubbles induce evaporation of the water into the gas of the bubble, gradually increasing the water content and cooling the gases inside the bubble. After rising a certain distance, but not yet up to the level of the heat exchanger tubes, the bubble reach thermal and pressure equilibrium with the surrounding water as shown by bubble 483, which still rises 475 due to buoyancy. Further up within chamber #2, bubble 485 is contracting 480 and microdroplets 481 are forming inside as cooling continues—the water in these microdroplets arises both from the initial water content in the gas exiting demister 504 above chamber #4 and from the water evaporated into the bubble lower down within chamber #2.

Inside the heat exchanger tubes 456, steam from chamber #3 is flowing downwards, gradually condensing 474. The latent heat released by this condensation flows outwards 488 into the surrounding water, where it induces steam formation 472 on the outer walls of the heat exchanger tubes. This process is possible as discussed in FIG. 5 since the pressure within the heat exchanger tubes is slightly higher than the pressure outside, thus the boiling temperature outside the heat exchanger tubes 456 is slightly lower than the condensation temperature inside the heat exchanger tubes. The rising large bubbles 477 of gas from tubes 542 are broken into smaller bubbles 487 by impacting the heat exchanger tubes (these small bubble continue to rise 485 and resume expanding 486 due to heating—this impact also "scrubs" the nucleating steam bubbles 472 off the outside of the heat exchanger tubes. As the large upward-moving bubbles 477 contact the heat-exchanger tubes, they are reheated and resume expanding 478. At the surface of the water in chamber #2, the bursting bubbles 440 may produce droplets which are removed by demister 504. The heat exchanger tubes 456 near the top have small amounts of condensed droplets 470 forming in them. When the rising bubbles reach the water-steam interface they burst 440, releasing the combined gas and water vapor contained inside into the volume above the water-steam interface 414 in chamber #2.

Chamber #1—Coagulator Chamber

The coagulator chamber (406 chamber #1) is one possible initial entry point 421 for liquid wastes (typically at around 60° F.) into the system for reconditioning. Waste liquids enter chamber #1, passing between coagulator plates 420 (see FIG. 9). The coagulator plates are heated by the gases exiting from the heat exchanger tubes in chamber #2—this heating brings the temperature of the liquid wastes from an initial range near room temperature up to approximately 193° F. Due to the effects of the coagulation plates, the oil in the waste water separates partially from the water, forming a layer 496 which may be decanted off 555 through pipe 553 to pass to the clarifier (see FIG. 13) for subsequent processing and possibly for use as fuel for the pulse jet burner in chamber #3. The coagulation process is enhanced by both the oscillatory electrical bias on the plates (see FIG. 9) as well as the turbulent fluid flow between the plates with a ribbed structure as shown. Light ends 508 may be removed through the pipe at the top of chamber #1, also potentially to use for powering the pulse jet burner. The bottom of chamber #2 comprises a porous barrier 423, allowing flow of fluid and material between chambers #2 and #1 for later collection by either the auger 583 or concentrate removal tube 564, or deposition onto plates 514. The water-steam interface level 464 is lower than level 414 since the pressure in chamber #1 above the water-steam interface 416 is slightly higher than the pressure above the water-steam interface 414 in chamber #2. Contaminated water 436 flows upwards between the coagulator plates or around the coagulator tubes in an alternative embodiment of the coagulator employing tubes instead of plates.

Figure 6:
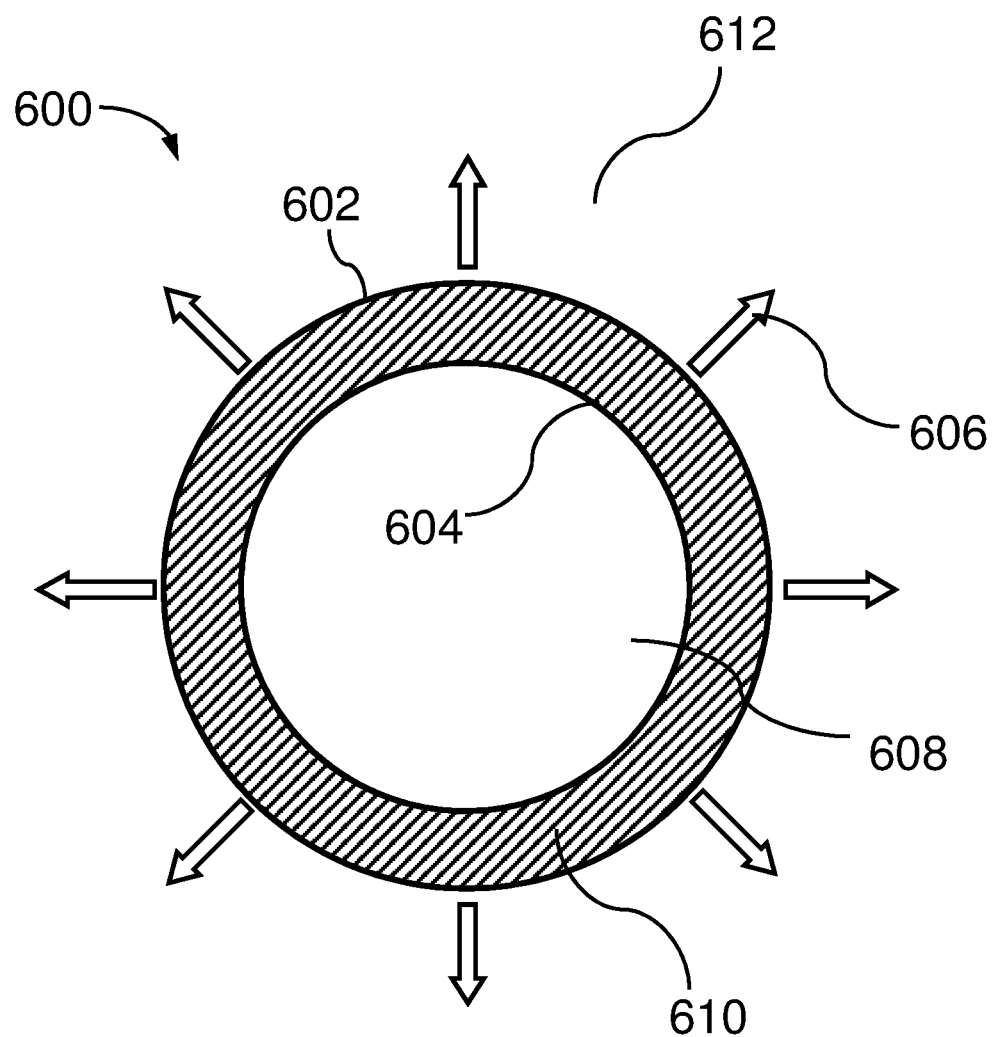
FIG. 6 is a cross-sectional view of a heat exchanger tube in chamber #2.

FIG. 6 is a cross-sectional view 600 of a heat exchanger (condenser) tube in chamber #2 with outer wall 602 and inner wall 604. The inside 608 of the heat exchanger tubes (see FIG. 11) is filled with steam from burner chamber #3. Latent heat energy from the condensation of this steam flows outwards through the wall 610 of the tube and generates steam on the outer wall 602 of the tube (see FIG. 11). Due to the small (a few inches typically) height difference between the water in chamber #3, which is higher than the water level in chamber #2, the boiling temperature in the water in chamber #2 is slightly below the condensation temperature inside the tube—thus the latent heat released by the condensation of the steam within the heat exchanger tube (which came from chamber #3) may flow out 606 through wall 610 to generate steam on the outer wall of the tube in chamber #2 by boiling water 612. This process occurs at 193° F. and the heat exchange process tends to maintain chamber #2 at this characteristic temperature.

Figure 9:
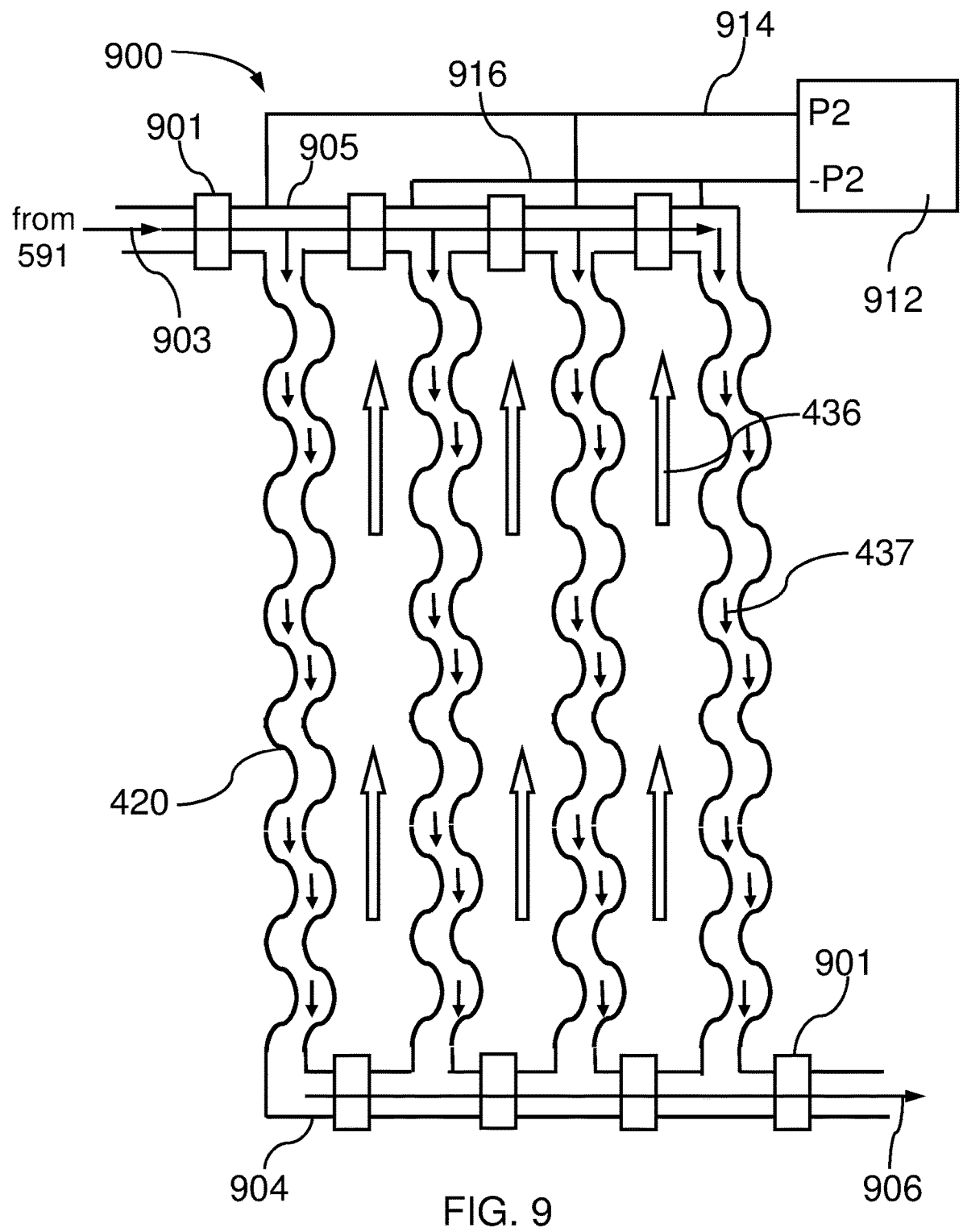
FIG. 9 is a schematic diagram of the coagulating plates in chamber #1

FIG. 9 is a schematic diagram 900 of the coagulation plates 420 in chamber #1. Cooled steam flows 903 in from the bottom of the heat exchanger tube array in chamber #2, and into an inlet manifold 905, then flows downward 437 (partially condensing as it flows) between pairs of plates (or within tubes in an alternative embodiment) to an outlet manifold 904 at the bottom, subsequently exiting 906 chamber #1.

Insulators 901 separate the pairs of coagulation plates 420 (pairs of tubes in an alternative embodiment), and a bipolar power supply 912 is configured to supply equal magnitude and opposite polarity voltages P1 and −P2 through wires 914 and 916 to alternate plates (or tubes) as shown. The transverse electric fields thus induced between the plates in the fluid between the pairs of plates induces coagulation of oils out of the contaminated waste water entering chamber #1 through tube 421 (see FIG. 5). Plates (or tubes) 420 are heated by the steam flow 437 between them, and this heat is subsequently transferred to the rising waste water 436 which reaches approximately 193° F. at the top of the coagulator plate array.

Dry Solids Processing Chamber (Dryer)

FIGS. 7A and 7B show side 700 and top 799 cross-sectional schematic views of the dry solids processing chamber #4. Superheated exhaust gases from both the inlet and outlet of the pulse jet burner are used to provide thermal energy to the dry solids processing chamber #3 (the "dryer", comprising the main and secondary dryers). Exhaust 715 from the inlet of the pulse jet burner (typically about 40% of the total exhaust) enters though pipe 714 into the steam generating chamber formed between the inner 708 and outer 706 walls of the main dryer. Exhaust 739 from the outlet of the pulse jet burner (typically about 60%) is directed into the inner volume of the dryer through pipe 738. This exhaust is aimed generally tangentially as shown in FIG. 7B, thereby inducing a vortex 710 within the inner chamber 712—this vortex facilitates gas mixing and the breaking up of solid waste residues into smaller particles for enhanced drying action. The superheated exhaust 739 is directed against a catalytic plate 798 (such as an iron plate) which may be thermally insulated to enable it to reach high temperatures for enhancement of catalytic water gas reactions for generation of carbon dioxide and hydrogen from initial carbon monoxide and water.

Figure 7D:
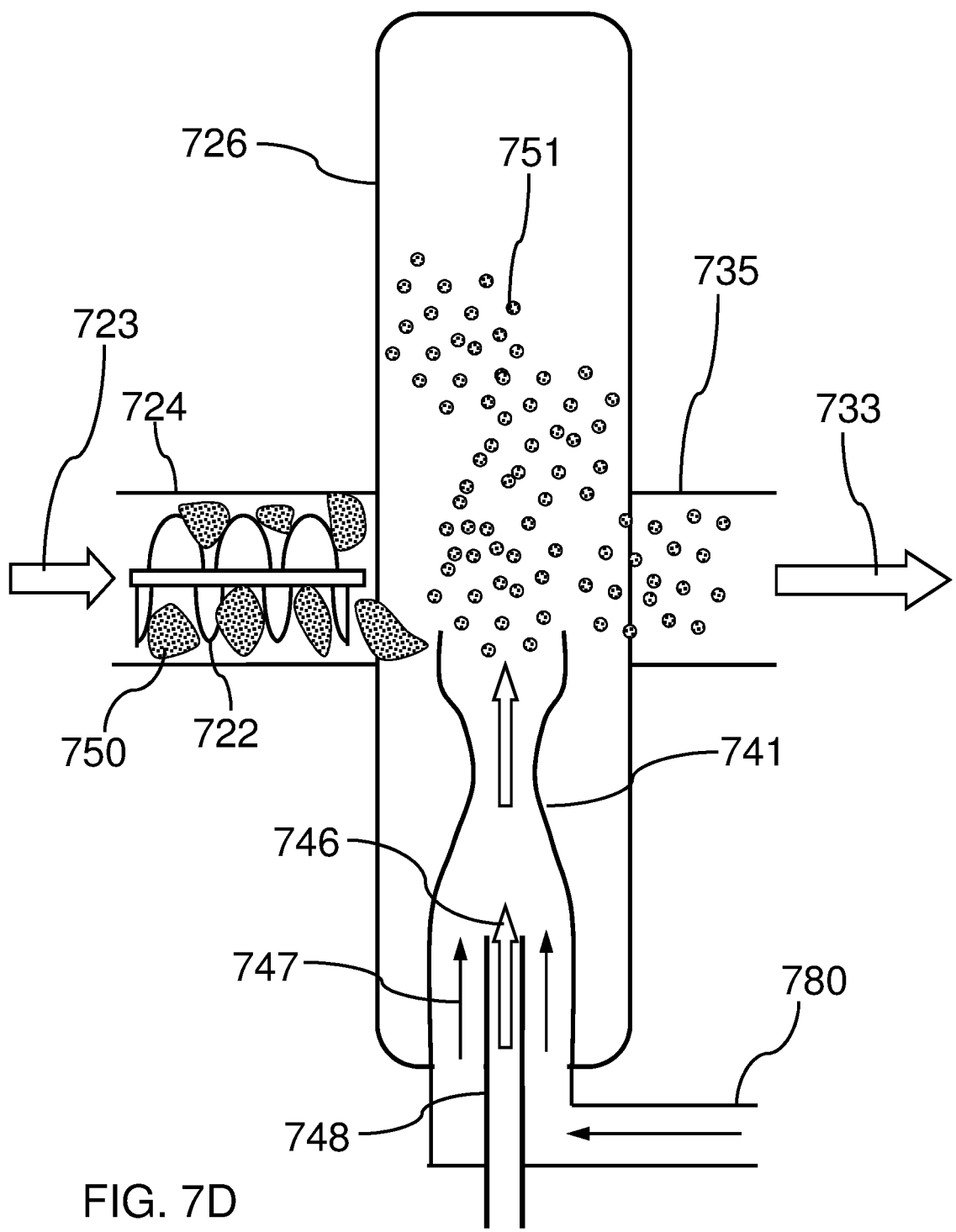
FIG. 7D is a detail view of the solids dryer component of chamber #4.
Figure 8:
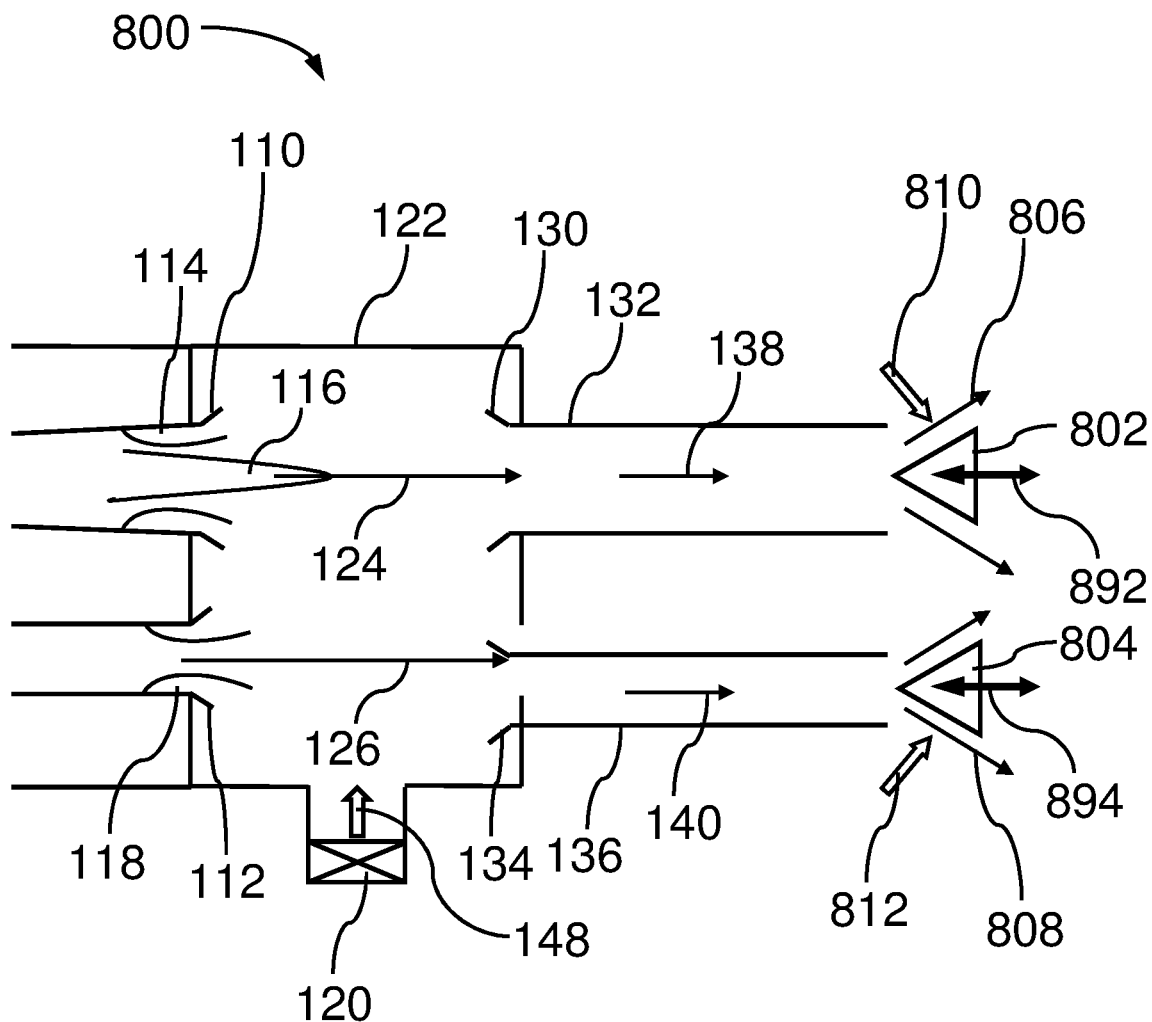
FIG. 8 is a schematic side cross-sectional view an alternative embodiment of the pulse jet burner in the burner chamber #3.

Within the volume between the inner 708 and outer 706 walls of the main dryer, the steam generation coil 713 is supplied at the top through tube 711 with feed water 709 which then flows downwards in the coil 713 to form steam 746 which is then directed through pipe 748 and throttle valve 744 into the secondary dryer 726 for use in breaking up larger chunks of wet solid waste (see FIG. 7D). Flue gas 730 may also be directed into the secondary dryer through valve 731.

At the bottom of the main dryer, solid material 716 falls into an auger 719 which removes 718 the dried solids through pipe 720. Alternatives to an auger include a conveyor belt, or a solid collection chamber directly below the main dryer. At the top of the main dryer, an exhaust gas plenum 701 collects the lighter dried material which was circulated within the gas vortex and due to its lower weight has moved inwards (while heavier wet materials flowed outwards until they were dried more). Also flowing 702 out the plenum 701 are superheated flue gas, steam, nitrogen, and carbon dioxide 703. This gas mixture is directed into tubes 542 at the bottom of chamber #2 to drive the heat exchanger and coagulation processes there (see FIG. 11). To enhance the catalytic drying processes within the inner chamber, in some embodiments the inner wall of the inner chamber may be lined with catalytic metal plates, such as mu-steel.

At the left of FIGS. 7A and 7B, the secondary dryer is shown with auger 722 feeding wet solid wastes 723 through tube 724 into an intersecting flow of flue gases and steam (see FIG. 7D). FIG. 7C illustrates 788 the vortex flow 728 within the secondary dryer—note that this flow is shown in a vertical plane, whereas the vortex flow in the main dryer is in a horizontal plane—the specific orientations of these flows is purely illustrative here.

FIG. 7D is a detail view of the secondary dryer of chamber #4. Steam 746 produced in the steam generator formed between the inner 708 and outer 706 walls of the main dryer is fed in through nozzle 748 at supersonic speeds, entraining the hot flue gases 747 coming from pipe 780, which then flow through an optional Venturi tube 741 which raises the velocity (by converting the steam pressure into kinetic energy) and impacting the wet solid wastes 750 being fed into the secondary dryer by auger 722. As a result of the supersonic impact of the combined steam and flue gas, the larger chunks of wet solid waste material 750 are broken up into smaller particles 751 with greatly increased surface area-to-volume ratios to accelerate drying in the main dryer. The broken up wet solid wastes are then swept 733 into the main dryer through pipe 735 by the flow of steam and flue gas Optionally, condensate 792 in pipe 790 which is connected to pipe 564 at the bottom of chambers #1-#3 may be entrained and injected into the main dryer. Prior to injection of condensate 792 (i.e., between the exit from chambers #1-#3 and injection into chamber #4), iron nanoparticles may be injected into condensate 792. These iron nanoparticles may enhance the steam reforming ($2H_2O \rightarrow 2H_2 + O_2$) which occurs at catalysis plate 798

Similarly, and also optionally, condensate 743 in pipe 742 which is connected to pipe 564 at the bottom of chambers #1-#3 may be entrained and injected into the main dryer.

Floating Dome Digester

Figure 10A:
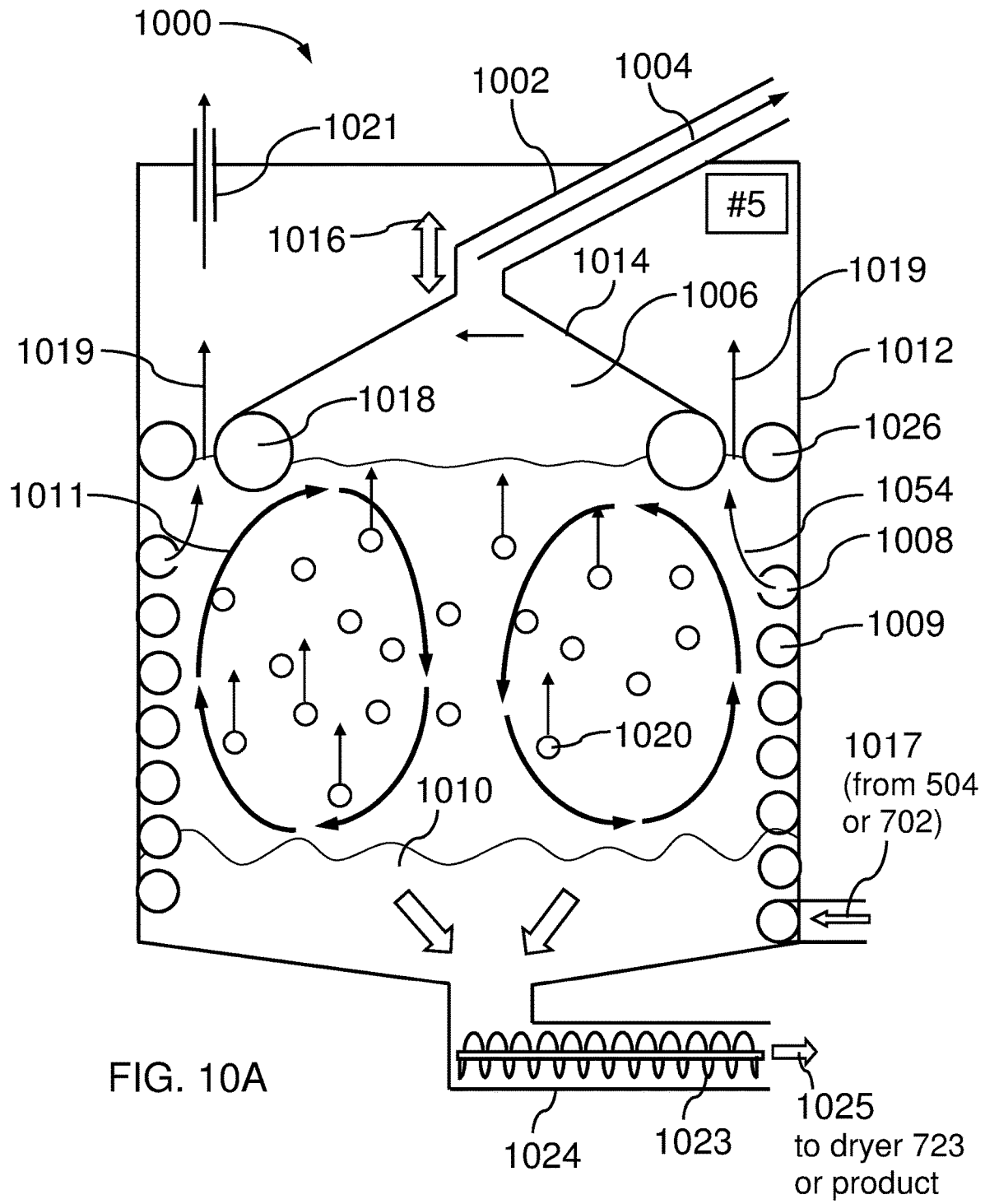
FIG. 10A is a side schematic cross-section of the floating dome digester—chamber #5.

FIG. 10A is a side schematic cross-section 1000 of the floating dome digester—chamber #5, with outer wall 1012. Wet solid organic sludge 1010 is heated by the lower portion of steam coil 1009, which is fed by hot flue gas 1017 from the dry solids processing chamber #4 or from the output of demister 504 at the top of chamber #2. This heat produces convection flows 1011 in the liquid, thereby enhancing the waste digestion process. Methane bubbles 1020 rise from the digesting solids 1010 and are collected 1006 by the floating dome 1014, and then exit 1004 the digester through pipe 1002. The floating dome 1014 is supported by inner float ring 1018, which floats inside an outer float ring 1026, dome 1014 moves up and down 1016 following the height of fluid in the digester. Outer float ring 1026 moves up and down along with dome 1014, maintaining the gap between the inner 1018 and outer 1026 float rings. The gap between float rings 1026 and 1018 allows the flue gases 1019 which emerge from the top of the heater tube (see FIG. 10B) to be separated from the methane as shown. A small amount of methane rising near upper heater coil 1008 may be lost through this gap; however a minimal fraction of the flue gas will end up collected by the floating dome and thus contaminating the methane. The flue gas passes out the top of the chamber through pipe 1021. At the bottom of the floating dome digester an auger removes solid material which may be either useful product, or may be fed to the dry solids processing chamber #4. At the bottom of the floating dome digester, and auger 1023 removes the sludge 1025 through tube 1024

Figure 10B:
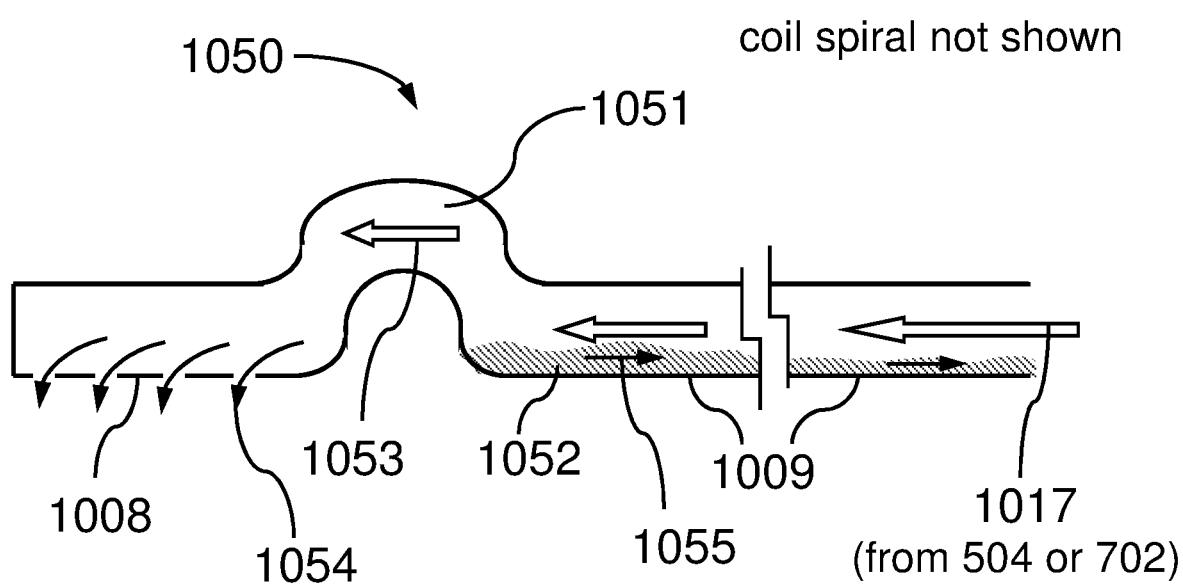
FIG. 10B is a close-up schematic diagram of heating coil detail in the floating dome digester.

FIG. 10B is a close-up schematic diagram 1050 of heating coil detail in the floating dome digester. The coil spiral is omitted here for clarity. At the left, the upper turn 1009 of the heater coil is shown to have vents at the bottom, enabling the hot flue gases 1054 to exit into the liquid in the digester at the top and outer wall 1012, then to pass through the gap between floats 1026 and 1018 as explained in FIG. 10A. The lower turns 1008 of the heater coil do not have vents. Condensate 1052 which forms within the heater coil due to cooling of the coil by the surrounding liquid flows downward 1055 and may be separated from the incoming gas 1017. A liquid carry-over preventer 1051 between the lower coil 1009 and the upper coil 1008 prevents this condensate from entering the liquid in the digester, while the vapor 1053 is able to pass through the liquid carry-over preventer 1051 as shown.

Peltier Effect Power Generation System

Figure 12:
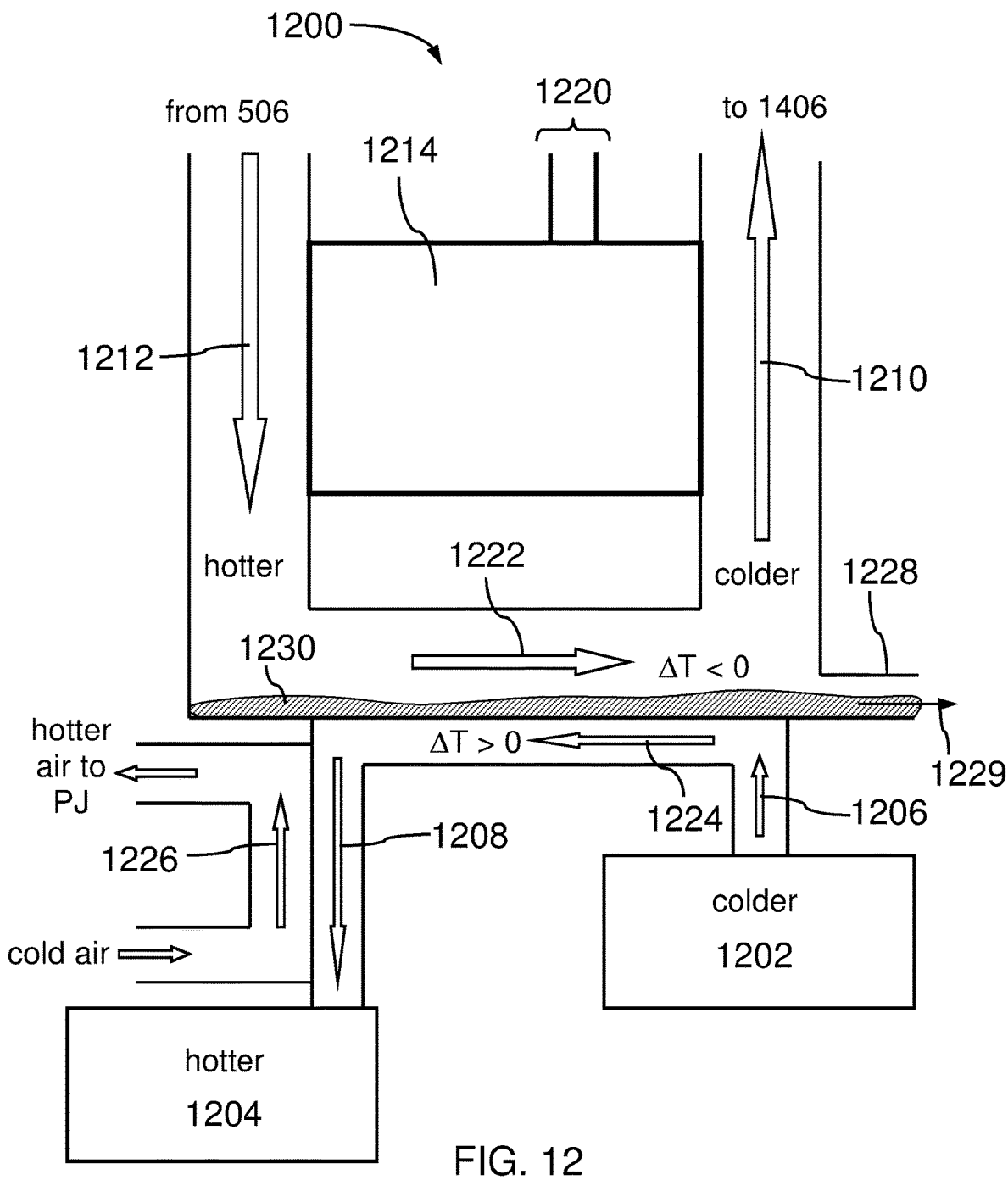
FIG. 12 is a schematic diagram of the Peltier effect power generation system.

FIG. 12 is a schematic diagram 1200 of the Peltier effect power generation system which is used to produce electricity 1220 within the system for various purposes, including the various power supplies used to generate the voltages for the coagulation plates and tubes. Hot gases 1212 from the top of chamber #2 enter at the left and pass by the hot side of the Peltier device 1214 at the left of FIG. 12. Condensable gases (principally water) within gases 1212 may condense 1230 after these gases are cooled by the heat exchanger. This condensate 1229 may be drained off through tube 1228. The cooled gases 1210 pass by the cold side of the Peltier device 1214 at the right of FIG. 12. Peltier devices generate electricity from a temperature differential—the electrical energy is derived by absorbing a small fraction of the heat of the gas passing by the hot side of the device and then transferring this heat to the fluid passing by the cold side of the device.

At the bottom of FIG. 12, relatively cold liquid 1206 from the accumulator tank 1202 flows 1224 to the left through the heat exchanger, absorbing some heat from the hot gases flowing 1222 to the right. This heated liquid then may pass through a second heat exchanger shown at the lower left, where cold air may be preheated 1226 by absorbing heat from liquid 1208—this preheated air then flows to the pulse jet burner, where the combustion efficiency is improved through the use of preheated air (less energy from the burning fuel is used to heat the air). Liquid 1208 is stored in tank 1204.

Decanter (Clarifier)

Figure 13:
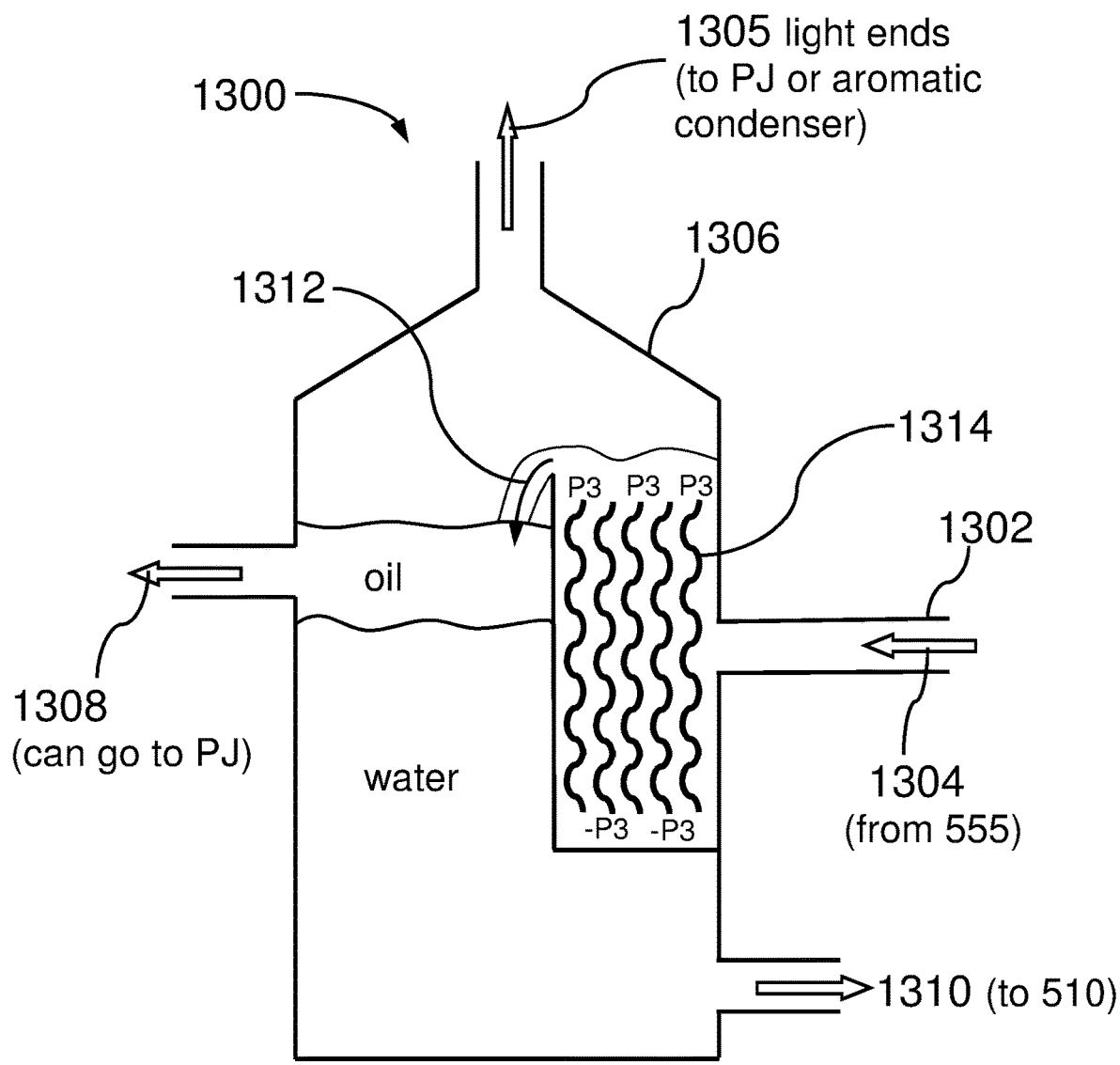
FIG. 13 is a schematic diagram of the decanter.

FIG. 13 is a schematic diagram 1300 of the decanter (clarifier) 1306. Oil 1304 from chamber #1 enters the baffling plate array 1314 within enclosure 1308 through pipe 1302, wherein alternating metal plates may have opposite voltages applied (P3 and −P3). Alternatively, the baffling plates may be fabricated from fiberglass or plastic insulating materials which will spontaneously develop static electricity-induced charging without the need for a power supply. The water plus emulsified oil mixture then overflows 1312 into the remainder of the decanter, where the oil layer on top may pass out 1308 for use in the pulse jet burner, while the purified water 1310 may pass out the bottom to be fed into chamber #2 through tube 510, thereby replenishing the water levels in chambers #1–#3. At the top of the decanter, light ends 1305 exit, for use in the pulse jet burner or to go to an aromatic condenser. In some embodiments, UV illumination at targeted wavelengths may be used to enhance the oil-water separation process—pipe 1302 may be clear to facilitate UV transmission into the liquid 1304. In some embodiments, pipe 1302 maybe be heated to improve the oil-water separation process.

Wet Scrubber Subsystem

Figure 14:
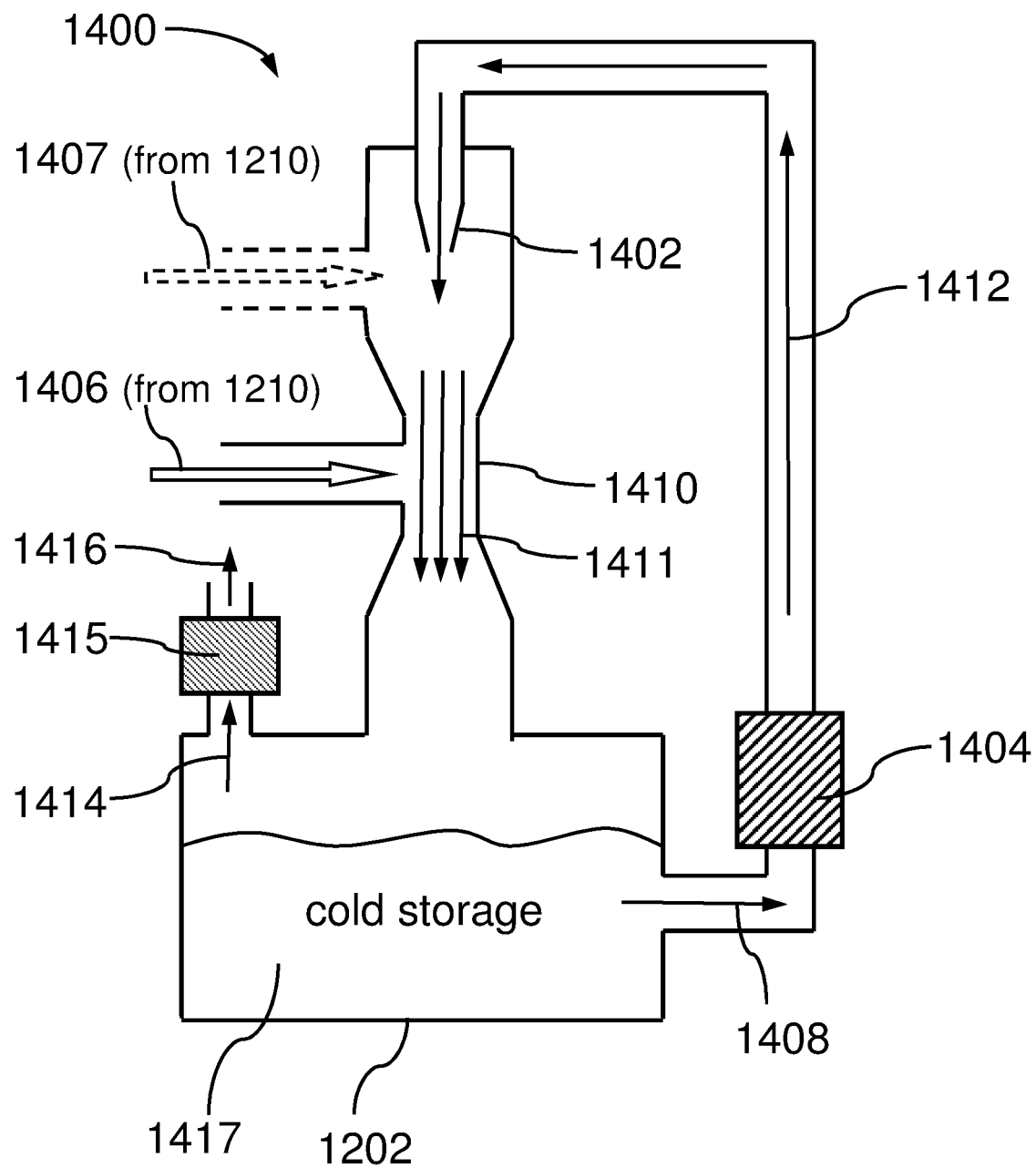
FIG. 14 is a schematic diagram of the wet scrubber subsystem.

FIG. 14 is a schematic diagram 1400 of the wet scrubber subsystem. The cooled gases 1406 exiting heat exchanger #1 in the Peltier effect power generation system enter the wet scrubber subsystem preferably at a low pressure region—one purpose of the wet scrubber is to draw a suction on these gases through the preceding sections of the Peltier effect power generation system. An alternative entry point 1407 is shown dashed. Storage tank contains relatively cold water 1417. Cold water 1408 from the accumulator tank 1202 is forced 1412 through nozzle 1402 by pump 1404—this cooled water then scrubs the gases by both direct cooling from the water as well as due to the expansion of the gases below the Venturi, causing gas acceleration 1411. The regions just above the Venturi 1410 and in the Venturi form impaction zones which enhance the formation and removal of solids and microdroplets from the gas flow. Gases venting from the storage tank 1202 may pass 1414 through an absorption scrubber 1415 before release 1416 to the atmosphere.

Some embodiments of the invention provide a thermal processing apparatus for processing contaminated liquids and solid wastes, comprising:
  a first chamber, comprising:
    a water-filled burner chamber, comprising:
      a pulse jet burner, fully immersed in the water and having an inlet and an outlet; and
      a first steam outlet; and
    an air-filled supercharger box configured to provide air to the inlet and outlet of the pulse jet burner;
  a second chamber, comprising an array of heat exchanger tubes having a first steam inlet and a second steam outlet, wherein the first steam inlet is configured to receive steam from the first steam outlet; and
  a third chamber, comprising an array of coagulator tubes or plates having a second steam inlet, wherein the second steam inlet is configured to receive steam from the second steam outlet.

In some embodiments, the supercharger box further comprises a fan configured to raise the air pressure within the supercharger box up to 3 atmospheres pressure to enhance the combustion efficiency of the pulse jet burner.

In some embodiments, the pulse jet burner comprises a combustion chamber having inner and outer walls, wherein the inner wall is thermally insulated from the outer wall and is comprised of high temperature metal, and wherein the outer wall is in contact with the water.

In some embodiments, the combustion chamber further comprises an injector for injecting fuel between the inner and outer walls for pre-heating, and wherein the inner wall is configured with a multiplicity of openings to enable the pre-heated fuel to enter the combustion chamber.

In some embodiments, the second chamber further comprises a demister at the top of the chamber for removing carry-over liquid droplets from the gas flow exiting from the second chamber through the demister.

In some embodiments, the first, second, and third chambers are open at the bottom into a common volume.

In some embodiments, the thermal processing apparatus further comprises an array of electrically-biased plates configured in the common volume to remove dissolved metals from the liquid in the common volume, to magnetically remove iron, and to hydrolyze water.

In some embodiments, the thermal processing apparatus further comprises an auger for removal of solid waste accumulated within the common volume.

In some embodiments, the thermal processing apparatus further comprises a gas outlet at the top of the third chamber for venting of "light ends".

In some embodiments, the thermal processing apparatus further comprises a fourth chamber, configured as a dryer for wet solid wastes and comprising:
- an inner chamber;
- an outer chamber surrounding the inner chamber;
- a first inlet configured to receive a first portion of hot flue gas from the supercharger box and to inject the first portion into the inner chamber tangentially, thereby inducing vortex motion of gases within the inner chamber;
- a steam generating coil configured in the space outside the inner chamber and inside the outer chamber; and
- a second inlet configured to receive a second portion of hot flue gas from the supercharger box and to inject the second portion into the space outside the inner chamber and inside the outer chamber, thereby heating the steam generating coil to produce steam.

In some embodiments, the fourth chamber further comprises an auger for removal of solid waste accumulated at the bottom of the inner chamber.

In some embodiments, wherein the fourth chamber further comprises a secondary dryer for partially drying wet solid waste, wherein the secondary dryer is configured to inject the partially dried solid wastes into the inner chamber.

In some embodiments, the secondary dryer is configured with an auger for feeding wet solid waste into the secondary dryer.

In some embodiments, the thermal processing apparatus further comprises tuning cones for controlling the pulse frequency of the pulse jet burner, independently of the power output from the pulse jet burner.

Some embodiments provide a thermal processing apparatus for processing contaminated liquids and solid wastes, comprising:
- a first chamber, comprising:
  - a water-filled burner chamber, comprising:
    - a pulse jet burner, fully immersed in the water and comprising:
      - an inlet;
      - an outlet; and
      - a combustion chamber, comprising inner and outer walls, wherein the inner wall is thermally insulated from the outer wall and is comprised of high temperature metal, and wherein the outer wall is in contact with the water; and
    - a first steam outlet; and
  - an air-filled supercharger box configured to provide air to the inlet and outlet of the pulse jet burner;
- a second chamber, comprising an array of heat exchanger tubes having a first steam inlet and a second steam outlet, wherein the first steam inlet is configured to receive steam from the first steam outlet;
- a third chamber, comprising an array of coagulator tubes or plates having a second steam inlet, wherein the second steam inlet is configured to receive steam from the second steam outlet; and
- a fourth chamber, configured as a dryer for wet solid wastes and comprising:
  - an inner chamber;
  - an outer chamber surrounding the inner chamber;
  - a first inlet configured to receive a first portion of hot flue gas from the supercharger box and to inject the first portion into the inner chamber tangentially, thereby inducing vortex motion of gases within the inner chamber;
  - a steam generating coil configured in the space outside the inner chamber and inside the outer chamber; and
  - a second inlet configured to receive a second portion of hot flue gas from the supercharger box and to inject the second portion into the space outside the inner chamber and inside the outer chamber, thereby heating the steam generating coil to produce steam.

In some embodiments, the supercharger box further comprises a fan configured to raise the air pressure within the supercharger box up to 3 atmospheres pressure to enhance the combustion efficiency of the pulse jet burner.

In some embodiments, the combustion chamber further comprises an injector for injecting fuel between the inner and outer walls for pre-heating, and wherein the inner wall is configured with a multiplicity of openings to enable the pre-heated fuel to enter the combustion chamber.

In some embodiments, the first, second, and third chambers are open at the bottom into a common volume, and wherein an array of electrically-biased plates is configured in the common volume to remove dissolved metals from the liquid in the common volume, to magnetically remove iron, and to hydrolyze water.

In some embodiments, the thermal processing apparatus further comprises:
- an auger for removal of solid waste accumulated within the common volume; and
- a gas outlet at the top of the third chamber for venting of "light ends".

19. The thermal processing apparatus of claim 14, wherein the fourth chamber further comprises:
- an auger for removal of solid waste accumulated at the bottom of the inner chamber; and
- wherein an auger is configured to inject wet solid waste into the secondary dryer.

Some embodiments of the invention provide a thermal processing apparatus for processing contaminated liquids and solid wastes, comprising:
- a first chamber, comprising:
  - a water-filled burner chamber, comprising:
    - a forced draft burner, fully immersed in the water and comprising:
      - a first outlet;
      - a second outlet; and
      - a combustion chamber; and
    - a first steam outlet; and
  - an air-filled supercharger box configured to provide pressurized air to the first and second outlets;
- a second chamber, comprising an array of heat exchanger tubes having a first steam inlet and a second steam outlet, wherein the first steam inlet is configured to receive steam from the first steam outlet;
- a third chamber, comprising an array of coagulator tubes or plates having a second steam inlet, wherein the second steam inlet is configured to receive steam from the second steam outlet; and
- a fourth chamber, configured as a dryer for wet solid wastes and comprising:
  - an inner chamber;
  - an outer chamber surrounding the inner chamber;
  - a first inlet configured to receive a first portion of hot flue gas from the supercharger box and to inject the first portion into the inner chamber tangentially, thereby inducing vortex motion of gases within the inner chamber;

a steam generating coil configured in the space outside the inner chamber and inside the outer chamber;
a second inlet configured to receive a second portion of hot flue gas from the supercharger box and to inject the second portion into the space outside the inner chamber and inside the outer chamber, thereby heating the steam generating coil to produce steam; and
a secondary dryer for partially drying wet solid waste, wherein the secondary dryer is configured to inject the partially dried solid wastes into the inner chamber, and wherein the secondary dryer comprises an auger configured to inject wet solid waste into the secondary dryer.

In some embodiments, the supercharger box further comprises a fan configured to raise the air pressure within the supercharger box up to 3 atmospheres pressure to enhance the combustion efficiency of the forced draft burner.

In some embodiments, the first, second, and third chambers are open at the bottom into a common volume, and wherein an array of electrically-biased plates is configured in the common volume to remove dissolved metals from the liquid in the common volume.

In some embodiments, the thermal processing apparatus further comprises:
an auger for removal of solid waste accumulated within the common volume; and
a gas outlet at the top of the third chamber for venting of "light ends".

In some embodiments, the fourth chamber further comprises:
an auger for removal of solid waste accumulated at the bottom of the inner chamber; and
a secondary dryer for drying wet solid waste, and configured to inject the dried solid wastes into the inner chamber.

Some embodiments of the invention provide a method for thermal processing of contaminated liquids and solid wastes, comprising:
configuring a thermal processing system to comprise:
a first chamber, comprising:
a water-filled burner chamber, comprising:
a pulse jet burner, fully immersed in the water and comprising:
an inlet;
an outlet; and
a combustion chamber; and
a first steam outlet; and
an air-filled supercharger box configured to provide air to the inlet and outlet of the pulse jet burner;
a second chamber, comprising an array of heat exchanger tubes having a first steam inlet and a second steam outlet, wherein the first steam inlet is configured to receive steam from the first steam outlet;
a third chamber, comprising an array of coagulator tubes or plates having a second steam inlet, wherein the second steam inlet is configured to receive steam from the second steam outlet; and wherein the first, second, and third chambers are open at the bottom into a common volume;
an array of electrically-biased plates configured in the common volume to remove dissolved metals from the liquid in the common volume, to magnetically remove iron, and to hydrolyze water;
an auger for removal of solid waste accumulated within the common volume; and
a fourth chamber, comprising:
an inner chamber;
an outer chamber surrounding the inner chamber;
a first inlet configured to receive a first portion of the hot flue gas from the supercharger box and to inject the first portion into the inner chamber tangentially;
a steam generating coil configured in the space outside the inner chamber and inside the outer chamber; and
a second inlet configured to receive a second portion of the hot flue gas from the supercharger box and to inject the second portion into the space outside the inner chamber and inside the outer chamber; and
a secondary dryer for partially drying wet solid waste, wherein the secondary dryer is configured to inject the partially dried solid wastes into the inner chamber, and wherein the secondary dryer comprises an auger configured to inject wet solid waste into the secondary dryer;
burning fuel within the pulse jet burner to:
generate hot flue gases;
heat the pulse jet burner to a temperature sufficient to boil water in contact with the outside surfaces of the pulse jet burner, thereby creating steam; and
generate pressure pulses within the water;
flowing water into the steam generating coil;
directing a first portion of the hot flue gases into the space outside the inner chamber and inside the outer chamber, thereby heating the water in the steam generating coil to produce steam;
injecting wet solid wastes into the secondary dryer;
partially drying the wet solid wastes in the secondary dryer;
injecting the partially dried solid wastes into the inner chamber;
directing a second portion of the hot flue gases into the inner chamber, thereby inducing:
vortex motion of gases within the inner chamber; and
drying of the partially dried solid waste material;
conducting the steam generated by the pulse jet burner to the heat exchanger tubes, thereby heating and boiling the contaminated fluids within the second chamber; and
conducting the steam from the heat exchanger tubes to the coagulator tubes to facilitate initial processing of contaminated fluids.

Some embodiments provide a method for thermal processing of contaminated liquids and solid wastes, comprising:
burning fuel within a pulse jet burner to:
generate hot flue gases;
heat the pulse jet burner to a temperature sufficient to boil water in contact with the outside surfaces of the pulse jet burner, thereby creating steam; and
generate pressure pulses within the water;
flowing water into a steam generating coil;
directing a first portion of the hot flue gases into a space outside an inner chamber and inside of an outer chamber, thereby heating the water in the steam generating coil to produce steam;
injecting wet solid wastes into a secondary dryer;
partially drying the wet solid wastes in the secondary dryer;
injecting the partially dried solid wastes into the inner chamber;
directing a second portion of the hot flue gases into the inner chamber, thereby inducing:

vortex motion of gases within the inner chamber; and drying of the partially dried solid waste material;

conducting the steam generated by the pulse jet burner to heat exchanger tubes, thereby heating and boiling the contaminated fluids within a second chamber; and conducting the steam from the heat exchanger tubes to coagulator tubes to facilitate processing of contaminated fluids.

Although embodiments of the present invention and their advantages are described in detail above and below, it should be understood that the described embodiments are examples only, and that various changes, substitutions and alterations can be made herein without departing from the spirit and scope of the invention as defined by the appended claims. The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

We claim as follows:

1. A thermal processing apparatus for processing contaminated liquids and solid wastes, comprising:
    a first chamber, comprising:
        a water-filled burner chamber, comprising:
            a pulse jet burner, fully immersed in the water and comprising:
                an inlet;
                an outlet; and
                a combustion chamber, comprising inner and outer walls, wherein the inner wall is thermally insulated from the outer wall and is comprised of high temperature metal, and wherein the outer wall is in contact with the water; and
            a first steam outlet; and
        an air-filled supercharger box configured to provide air to the inlet and outlet of the pulse jet burner;
    a second chamber, comprising an array of heat exchanger tubes having a first steam inlet and a second steam outlet, wherein the first steam inlet is configured to receive steam from the first steam outlet;
    a third chamber, comprising an array of coagulator tubes or plates having a second steam inlet, wherein the second steam inlet is configured to receive steam from the second steam outlet; and
    a fourth chamber, configured as a dryer for wet solid wastes and comprising:
        an inner chamber;
        an outer chamber surrounding the inner chamber;
        a first inlet configured to receive a first portion of hot flue gas from the supercharger box and to inject the first portion into the inner chamber tangentially, thereby inducing vortex motion of gases within the inner chamber;
        a steam generating coil configured in the space outside the inner chamber and inside the outer chamber; and
        a second inlet configured to receive a second portion of hot flue gas from the supercharger box and to inject the second portion into the space outside the inner chamber and inside the outer chamber, thereby heating the steam generating coil to produce steam.

2. The thermal processing apparatus of claim 1, the supercharger box further comprising a fan configured to raise the air pressure within the supercharger box up to 3 atmospheres pressure to enhance the combustion efficiency of the pulse jet burner.

3. The thermal processing apparatus of claim 1, the combustion chamber further comprising an injector for injecting fuel between the inner and outer walls for pre-heating, and wherein the inner wall is configured with a multiplicity of openings to enable the pre-heated fuel to enter the combustion chamber.

4. The thermal processing apparatus of claim 1, wherein the first, second, and third chambers are open at the bottom into a common volume, and wherein an array of electrically-biased plates is configured in the common volume to remove dissolved metals from the liquid in the common volume, to magnetically remove iron, and to hydrolyze water.

5. The thermal processing apparatus of claim 4, further comprising:
    an auger for removal of solid waste accumulated within the common volume; and
    a gas outlet at the top of the third chamber for venting of "light ends".

6. The thermal processing apparatus of claim 1, wherein the fourth chamber further comprises:
    an auger for removal of solid waste accumulated at the bottom of the inner chamber; and
    wherein an auger is configured to inject wet solid waste into the secondary dryer.

* * * * *